ized) United States Patent
Borthwick et al.

(10) Patent No.: US 7,899,796 B1
(45) Date of Patent: *Mar. 1, 2011

(54) BATCH AUTOMATED BLOCKING AND RECORD MATCHING

(76) Inventors: Andrew Borthwick, Brooklyn, NY (US); Arthur Goldberg, New York, NY (US); Put Cheung, Scotch Plains, NJ (US); Adam Winkel, New York, NY (US)

( * ) Notice: Subject to any disclaimer, the term of this patent is extended or adjusted under 35 U.S.C. 154(b) by 1475 days.

This patent is subject to a terminal disclaimer.

(21) Appl. No.: 11/285,215

(22) Filed: Nov. 23, 2005

Related U.S. Application Data

(60) Provisional application No. 60/630,034, filed on Nov. 23, 2004.

(51) Int. Cl.
*G06F 7/00* (2006.01)
*G06F 17/00* (2006.01)
(52) U.S. Cl. ...................................... 707/692
(58) Field of Classification Search ........................ None
See application file for complete search history.

(56) References Cited

U.S. PATENT DOCUMENTS

| 5,497,486 | A | 3/1996 | Stolfo et al. |
| 5,514,534 | A | 5/1996 | Chuah et al. |
| 5,668,987 | A | 9/1997 | Schneider |
| 5,717,915 | A | 2/1998 | Stolfo et al. |
| 5,802,518 | A | 9/1998 | Karaev et al. |
| 5,819,291 | A | 10/1998 | Haimowitz et al. |
| 5,960,430 | A | 9/1999 | Haimowitz et al. |
| 5,970,482 | A | 10/1999 | Pham et al. |
| 5,991,758 | A | 11/1999 | Ellard |
| 6,092,034 | A | 7/2000 | McCarley et al. |
| 6,336,117 | B1 | 1/2002 | Massarani |
| 6,438,741 | B1 | 8/2002 | Al-omari et al. |
| 6,578,056 | B1 * | 6/2003 | Lamburt ..................... 715/205 |
| 6,598,042 | B1 | 7/2003 | Kienan |
| 6,804,662 | B1 | 10/2004 | Annau et al. |
| 7,290,019 | B2 * | 10/2007 | Bjorner et al. .............. 707/638 |
| 2004/0172393 | A1 * | 9/2004 | Kazi et al. .................... 707/6 |
| 2008/0065630 | A1 * | 3/2008 | Luo et al. ..................... 707/6 |

OTHER PUBLICATIONS

A.J. Lait and Brian Randell. An assessment of name matching algorithms. Unpublished. Sep. 1995. Available from the author at Brian.Randell@newcastle.ac.uk.

Acharya, S., Gibbons, P., Poosala, V., Ramaswamy, S., Join Synopses for Approximate Query Answering, In Proceedings of the ACM SIGMOD Conference, pp. 275-286. ACM Press, 1999. # 287.

Aoki, P., "Algorithms for Index-Assisted Selectivity Estimation," in ICDE, p. 258, 1999. # 288.

(Continued)

*Primary Examiner*—Neveen Abel-Jalil
*Assistant Examiner*—Raheem Hoffler

(57) ABSTRACT

Batch, or "offline", blocking takes a set of records and generates sets (or blocks, hence the name blocking) of potentially matching records for the entire set. The blocks of potential matches are then passed to a matching process to evaluate which records match. Applications include but are not limited to individual matching such as student identification, householding, business matching, supply chain matching, financial matching, news or text matching, and other applications.

16 Claims, 12 Drawing Sheets

Example of non-limiting blocking and matching algorithm

OTHER PUBLICATIONS

Arellano, M.G. et al., "A probabilistic approach to the patient identification problem," Proceedings of the Fifth Annual Symposium on Computer Applications in Medical Care (Nov. 1981).

Arellano, M.G., "An implementation of a two-population Fellegi-Sunter probability model," U.S. Dept. of the Treasure, Publication 1200 (Dec. 1985).

Arellano, M.G., "Assessing the significance of a match," unpublished. Advanced Linkage Technologies of America, Inc. (Jan. 17, 1995).

Arellano, M.G., "Issues in identification and linkage of patient records across an integrated delivery system," Journal of Healthcare Information Management, 12 (3) 43-52 (Fall 1998).

Arellano, Max G.. An implementation of a two-population Fellegi-Sunter probability model. U.S. Department of the Treasury, Publication 1299. Dec. 1985.

Poosala, V., Ioannidis, Y., "Selectivity Estimation Without the Attribute Value Independence," Proceedings of VLDB, Athens Greece, pp. 486-495, Aug. 1997. # 308.

Barbara, D., DuMouchel, W., Faloutsos, C., Haas, P., Hellerstein, J., Ioannidis, Y., Jagadish, H., Johnson, T., Ng, R., Poosala, V., Ross, K., Sevcik, K., "The New Jersey Data Reduction Report, Data Engineering Bulletin," 20 (4), 1997. #289.

Belin, T.R. and Rubin, D.B., "A Method for Calibrating False-Match Rates in Record Linkage," Journal of The American Statistical Association, vol. 90, Issue 430, 697-707 (Jun. 1995).

Berger, A.L., et al., "A comparison of criteria for maximum entropy/minimum divergence feature selection," in Proceedings of the Third Conference on Empirical Methods in Natural Language Processing, N. Ide and A. Boutilainen, Eds., The Association for Computational Linguistics, pp. 97-106 (Jun. 1988).

Berger, A.L., et al., "A maximum entropy approach to natural language processing," Computational Linguistics 22(1):39-71 (1996).

Berger, Adam L., Stephen A. Della Pietra, Vincent J. Della Pietra. "An entropy maximum approach to natural language processing." Computational Linguistics, 22(1):39-71 (1996).

Bertolazzi, P. et al., "Supporting Trusted Data Exchanges in Cooperative Information Systems," pp. 1-37, Rome, Italy.

Bitton, D., DeWitt, D, Duplicate Record Elimination in Large Data Files. ACM Transactions on Database Systems 8 (1983), No. 2, 255-265. #312.

Borthwick, "The ChoiceMaker 2 Record Matching System," ChoiceMaker Technologies, Inc., pp. 1-7, (Nov. 1994).

Borthwick, A., "A Maximum Entropy Approach to Named Entity Recognition," PhD thesis, New York University, Available from the NYU Computer Science Dept. Library or at http://cs.nyu.edu/cs/projects/proteus/publication/index.html (1999).

Caruso, F., et al., "Telcordia's Database Reconciliation and Data Quality Analysis Tool," Proceedings of the 26th International Conference on Very Large Databases, Cairo, Egypt (2000).

Chakrabarti, K., Garofalakis, M., Rastogi, R., Shim, K., "Approximate Query Processing Using Wavelets," In Proceedings of 26th International Conference on Very Large Data Bases, Cairo, Egypt, pp. 111-122, 2000. # 290.

Chen, C., Roussopoulos, N., Adaptive Selectivity Estimation Using Query Feedback in Proceedings of the 1994 ACM SIGMOD International Conference on the Management of Data, pp. 161-172. ACM Press, 1994. # 291.

Chen, Ming-Syan et al., "Data Mining: An Overview from a Database Perspective," IEEE Transactions on Knowledge and Data Engineering, vol. 8, No. 6 1041-4347/96; 866-883, (Dec. 1996).

Christen, P., Churches, T, ."Febrl—Freely extensible biomedical record linkage," Release 0.2 edition, Apr. 2003. # 283.

Christen, P., "Probabilistic Name and Address Cleaning and Standardisation,".

Christodoulakis, S., "Estimating Block Transfers and Join Sizes," In Proceedings of the ACM SIGMOD International Conference on Management of Data, pp. 40-54, San Jose, California, May 1983. # 313.

Christodoulakis, S., "Estimating Record Selectivities," Information System, 8(2): 105-115, 1983. # 322.

Cochinwala, Kurien, Lalk, Shasha, Citations: Efficient Data Reconciliation- , hppt://citeseer.nj.nec.com/context/2036079/0 (printed Nov. 17, 2003).

Cochinwala, M., Dalal S., Elmagarmid A., and Verykios, V., "Record Matching: Past, Present and Future," Submitted to ACM Computing Surveys (2003) # 286.

Cochinwala, M., et al., "Efficient data reconciliation" Information Sciences 137 (2001) 1-15, Telcordia Technologies Inc. Published by Elsevier Science Inc.

Cochinwala, M., et al., "Arroyo: An Efficient Data Cleaning Tool," pp. 1-21 (Nov. 4, 1997).

Cohen, W., Richman, J., "Learning to Match and Cluster Large High-Dimensional Data Sets for Data Integration," in SIGKDD'02, 6 pages (2002) # 278.

Cohen, W., "Whirl: A Word-based Information Representation Language," Artificial Intelligence, 118:163-196, (2000). # 282.

Cohen, W.W., "Integration of heterogeneous databases without common domains using queries based on textual similarity," Proceedings of the ACM SIGMOD Conference on Data Management (1998).

Cohen, William W., "Some practical observations on integration of Web information," WebDB '99. 1999.

Copas, J.B., and Hilton, F.J., "Record Linkage: Statistical Models for Matching Computer Records," Journal of the Royal Statistical Society, Series A (Statistics in Society), vol. 153, Issue 3, 287-320 (1990).

Crystal, M.R. et al., Studies in Data Annotation Effectiveness, Proceedings of the DARPA BRoadcase News Workshop (HUB-4) (Feb. 1999).

Della Pietra, S., et al., "Inducing features of random fields," Technical Report CMU-CS-95-144, Carnegie Mellon University (1995).

Desjardins, M., Getoor, L., Koller, D., "Using Feature Hierarchies in Bayesian Network Learning" (Extended Abstract), Lecture Notes in Artificial Intelligence, 1864, (2000). # 292.

Dey, D., Mookerjee, V. , "A Sequential Technique for Efficient Record Linkage," Submitted to Operations Research Journal, (2000). Not included—no longer accessible.

Dey, D., Sarkar, S., De, P., "Entity Matching in Heterogeneous Databases: A Distance Based Decision Model," Proceedings of the 31st Hawaii International Conference on System Sciences, 1998. # 318.

Du Bose, Jeff Stokes. "Retaining duplicate data in an immunization registry." Pamphlet distributed by Scientific Technologies Corporation. Aug. 1998.

DuBose, J.S., "Defining duplicate records in an immunization registry," Pamphlet distributed by Scientific Technologies Corp. (Aug. 1998).

Elfeky, M., Verykios, V., Elmagarmid, A., "TAILOR: A Record Linkage Toolbox," Proceedings of the ICDE'02, 2002. # 285.

Elfeky, M.G., et al., "Record Linkage: A Machine Learning Approach, A toolbox, and a Digital Government Web Service," Dept. of Computer Sciences, Purdue University, Technical Report CSD-03-024.

Fair, M.E., et al., "Application of exact ODDS for partial agreements of names in record linkage," Computers and Biomedical Research 24, 58-71 (1991).

Fellegi ,Ivan P. and Alan B. Sunter. "A theory for record linkage." Journal of the American Statistical Association 64. 1183-1210. Dec. 1969.

Friedman, C. et al., "Tolerating spelling errors during patient validation," Computers and Biomedical Research 25, 486-509 (1992).

Galhardas, H., Florescu, D., Shasha, D., Simon, E., Saita, C., "Declarative data cleaning: Language, Model, and Algorithms," In Proc. of the 27th VLDB Conf., 2001. # 294.

Galhardas, H., Florescu, D., Shasha, D., SimonE.," AJAX: An Extensible Data Cleaning Tool." In Proceedings of ACM SIGMOD (Dallas, Texas, 2000), pp. 590. # 293 [Galhardas, H., et al., "An extensible framework for data cleaning," Tech. Rep. Institut National De Recherche en Informatique et en Automatique (Jul. 1999)].

Getoor, L., et al., "Selectivity Estimation using Probabilistic Models," ACM SIGMOD May 21-24, 2001 Santa Barbara, California.

Getoor, L., Friedman, N., Koller, D., Pfeffer, A., "Learning Probabilistic Relational Models," In Proceedings of the 18th Conference on Machine Learning, pp. 170-177, San Francisco, CA, 2001. Morgan Kaufmann. # 295.

Haas, P., Swami, A., "Sequential Sampling Procedures for Query Size Estimation," In Proceedings of 1992 ACM SIGMOD International Conference on Management of Data, pp. 341-350, 1992. # 314.

Harangsri, B., Shepherd, J., "Query Size Estimation using Systematic Sampling," Ngu, A. CODAS (1996): 550-553. # 297.

Hernandez, M., Stolfo, S., "Real-world data is dirty: Data Cleansing and the Merge/Purge problem," Journal of Data Mining and Knowledge Discovery, 1 (2), (1998) # 299.

Hernandez, M., Stolfo, S., "The Merge/Purge Problem for Large Databases," In Proc. of 1995 ACT SIGMOD Conf., pp. 127-1 38, (1995) # 300.

Hernandez, Mauricio A. and Salvatore J. Stolfo. "Real-world data is dirty: data cleansing and the merge/purge problem." Journal of Data Mining and Knowledge Discovery 2, 19-37. (1997).

Hernandez-Sherrington, M., "A Generalization of Band Joins and the Merge/Purge Problem," Ph.D. thesis, Department of Computer Sciences, Columbia University, (1996.). # 298.

Hylton, J.," Identifying and Merging Related Bibliographic Records," Master's thesis, Department of Electrical Engineering and Computer Science, Massachusetts Institute of Technology, 1996. # 281.

IBM, "Using Information Entropy to Select Learning Words," Mar. 1992, IBM, 34, 10B, 19-20.

IBM; "Inverting Noun-de-Noun Constructions in French-to-English Translation," in IBM Technical Disclosure Bulletin, IBM; TDB-ACC-No: NN9410243; 1-3 (Oct. 1, 1994).

Ioannidis, Y., Christodoulakis, S., "On the Propagation of Errors in the Size of Join Results," ACM SIGMOD 1991. # 301.

Ioannidis, Y., Poosala, V., "Balancing Histogram Optimality and Practicality for Query Result Size Estimation," in SIGMOD, 233-244, 1995. # 302.

Jaro, M., "Advances in Record-Linkage Methodology as Applied to Matching the 1985 Census of Tampa, Florida," Journal of the American Statistical Association 84(1989), No. 406, 414- 420. # 284.

Jaro, M.A., "Probabilistic linkage of large public health data files," Statistics in Medicine 14, 491-498 (1995).

Jaro, Matthew A., Advances in record-linkage methodology as applied to matching the 1985 census of Tampa, Florida. Journal of the American Statistical Association 84. Jun. 1989.

Jaynes, E.T., "Information Theory and Statistical Mechanics," The Physical Review, vol. 106, No. 4, 620-630 (May 15, 1957).

Jin I Li C., Mehrotra, S., Efficient Record Linkage in Large Data Sets Paper 113, UC Irvine Tech Reports, 2001. # 279.

Jocums, Stephanie, Stephen S. Entman, Jr., Edward F. Mitchel, and Joyce M. Piper. Using vital records linkage. American Journal of Preventive Medicine, 11(2):75-78. 1995.

Kilss, B., Alvey, W., Record linkage techniques—1985 Proceedings of the Workshop on Exact Matching Methodologies, May 1985, Department of the Treasury, Internal Revenue Service, Statistics Income Division. Not included—no longer accessible.

Kimball, Ralph, "The science of maintaining clean data in your warehouse, and why nobody talks about it," DBMS, Sep. 1996.

Lipton, R., Naughton, J., Query Size Estimation by Adaptive Sampling (Extended Abstract), Journal of Computer and System Science, 51, 18-25, 1985. #315.

Lipton, R., Naughton, J., Schneider, D., Practical Selectivity Estimation through Adaptive Sampling, in H. Garcia-Molina and H.V. Jagadish, editors, Proceedings of the 1990 ACM SIGMOD International Conference on the Management of Data, pp. 1-11. ACM Press, 1990. # 303.

Lynch, C., Selectivity Estimation and Query Optimization in Large Databases with Highly Skewed Distributions of Column Values Proc. 14th VLDB Conf., Los Angeles, CA, Aug. 1988. #316.

Macleod, M.C.M., et al., "Enhancing the power of record linkage involving low quality personal identifiers: use of the best link principle and cause of death prior likelihoods," Computers and Biomedical Research 31, 257-270 (1998).

Mannino M., Chu, P., Sager, T., Statistical Profile Estimation in Database Systems, Computing Surveys 20, 3 (Sep. 1988), 191-221. # 304.

McCallum, A., Nigam, K., Ungar, L., Efficient Clustering of High-Dimensional Data Sets with Application to Reference Matching, In KDD-00, pp. 1-22 (2000).

Monge, A. , Adaptive detection of approximately duplicate database records and the database integration approach to information discovery. Ph.D. thesis, Department of Computer Science and Engineering, University of California, San Diego, 1997. # 307.

Monge, A., Elkan, C., "An efficient domain-independent algorithm for detecting approximately duplicate database records," In Proc. of SIGMOD-1997 Workshop on Research Issues on Data Mining and Knowledge Discovery, pp. 23-29, Tucson, AZ, May 1997. #27.

Monge, A., Elkan, C., The Field Matching Problem: Algorithms and Applications, Second International Conference on Knowledge Discovery and Data mining (1996), 267-270, AAAI Press. # 85.

Monge, A., Matching Algorithms within a Duplicate Detection System Bulletin of the Technical Committee on Data Engineering, 23, 4, 2000. # 306.

Monge, Alvaro E. and Charles P. Elkan. The field matching problem: Algorithms and applications. Proceedings of the second international conference on knowledge discovery and data mining. Aug. 1996.

Muralikrishna, M., DeWitt, D., Equi-depth histograms for estimating selectivity factors for multi-dimensional queries. Proc. ACM SIGMOD, 1988, 28-36. # 321.

Neiling, M., "Data Fusion with Record Linkage," Online Proceedings of the 3rd Workshop Föderierte Datenbanken, (Dec. 11, 1998).

Newcombe, H., Kennedy, J., Axford, S., James, A., Automatic Linkage of Vital Records Science 130 (1959), No. 3381, 954-959. Not included—no longer accessible.

Newcombe, H., Record Linking: The Design of Efficient Systems for Linking Records into Individual and Family Histories, American Journal of Human Genetics 19 (1967), No. 3. Not included—no longer accessible.

Newcombe, H.B., "Handbook of Record Linkage: Methods for Health and Statistical Studies, Administration, and Business," Oxford Medical Publications (1988).

Newcombe, H.B., et al., "The use of names for linking personal records," Journal of the American Statistical Association 87 (Dec. 1992).

Piatetsky-Shapiro, G., Connell, C., Accurate Estimation of the Number of Tuples Satisfying a Condition In Proc. of the ACM SIGMOD Conference, pp. 256-276, 1984, # 319.

Pinheiro, Jose C., et al., "Methods for Linking and Mining Massive Heterogeneous Databases," Proceedings of the Fourth International Conference on Knowledge Discovery and Data Mining (Aug. 27-31, 1998).

Poosala, V., Histogram-Based Estimation Techniques in Database Systems, Ph. D. thesis, University of Wisconsin-Madison, 1997. Not included—no longer accessible.

Porter, E. H., and W. E. Winkler (1999), Approximate String Comparison and its Effect in an Advanced Record Linkage System, in Record Linkage Techniques Mar. 20-21, 1997, Washington, DC.

Printz, H., "Fast computation of maximum entropy/minimum divergence model feature gain," In Proceedings of the Fifth International Conference on Spoken Language Processing (1998).

Raman, V., Hellerstein, J., Potter's Wheel: An Interactive Data Cleaning System, In Proc. VLDB (Roma, Italy, 2001), pp. 381-390. # 224.

Ratnaparkhi, A., "A Maximum Entropy Model for Part-of-Speech Tagging," Proceedings of the Conference on Empirical Methods in Natural Language Processing, (1996).

Recommendations, The Matching Group, Administrative Records Subcommittee, Federal Committee on Statistical Methodology, pp. 3-4 (May 1985).

Record Linkage Workshop: Bibliography of Background Papers, U.S. Census Bureau, http://www.census.gov.srd/www/reclink/biblio.html (Jul. 18, 2002).

RLESearch—Probabilistic record linking engine, http://nedinfo.nih.gov/docs/RLESearch.htm 19 pages (Jul. 18, 2002).

Rosenfeld, R., "Adaptive Statistical Language Modeling: A Maximum Entropy Approach," PhD thesis, Carnegie Mellon University, CMU Technical Report CMU-CS-94-138 (1994).

Semaphore Corporation. Merge/Purge and Duplicate Detection. Web page. http://www.semaphorecorp.com/mpdd/mpdd.html. 1996.

Sun, W., Ling, Y., Rishe, N., Deng, Y., "An Instant and Accurate Size Estimation Method for Joins and Selection in a Retrieval-Intensive Environment." In Proceedings of the ACM SIGMOD Conference, pp. 79-88, 1993. #317.

The State of Record Linkage and Current Research Problems Winkler, W Proceedings of the Survey Methods Section (1999), 15 pages.

Trecom Business Systems and Dataline Inc., "UPIF process architecture," unpublished system documentation (Oct. 1997).

Ukkonen, E., "Finding Approximate Patterns in Strings," Journal of Algorithms 6:132-137 (1985).

Verykios, V., Elmagarmid, A., Elfeky, M., Cochinwala, M., Dalal, On the Accuracy and Completeness of the Record Matching Process, 5. 2000 Information Quality Conference (2000), 54-69. # 309.

Verykios, Vassilios et al., "Automating the Approximate Record Matching Process," Computer Sciences Dept., Purdue University, West Lafayette, IN, pp. 1-19 (Jun. 15, 1999).

Verykios, Vassilios S., Ahmed K. Elmagarmid, Elias N. Houstis: Automating the approximate record-matching process. Inf. Sci. 126(1-4): 83-98 (2000).

Verykios, Vassilios S., List of publications from the DBLP Bibliography Server—FAQ, 2 pages.

Wavelet-Based Histograms for Selectivity Estimation Matias, Y., Vitter, J., Wang, M. Proc. of the 998 ACM SIGMOD Intern. Conf. on Management of Data, 1998. # 305.

Winkler list of conference (6 pages).

Winkler list of references (6 pages).

Winkler, W. E. "Matching and Record Linkage," in B. G. Cox et al. (ed.) Business Survey Methods, New York: J. Wiley, 374-406 (1995).

Winkler, W. E. (1990), "String Comparator Metrics and Enhanced Decision Rules in the Fellegi- Sunter Model of Record Linkage," Proceedings of the Section on Survey Research Methods, American Statistical Association., 354-359.

Winkler, W. E. (1994), "Advanced Methods for Record Linkage," Proceedings of the Section on Survey Research Methods, American Statistical Association, 467-472 (longer version report 94/05 available at http://www.census.gov/srd/www/byyear.html).

Winkler, W., Exact Matching Lists of Businesses: Blocking, Subfield Identification, and Information Theory in Kilss and Alvey (1985), pp. 227-241, U.S. Internal Revenue Service, Publication 1299 (2-86). # 311.

Winkler, W., Record Linkage Software and Methods for Merging Administrative Lists Statistical Research Division Technical Report RRO1-03, U.S. Bureau of Census, 2001. # 320.

Winkler, W.E., "Advanced Methods for Record Linkage," Bureau of the Census, Washington DC.

Winkler, W.E., "Matching and Record Linkage," Chapter 20, U.S. Bureau of the Census (1995).

Winkler, W.E., "On Dykstra's Iterative Fitting Procedure," Annals of Probability, vol. 18, issue 3, 1410-1415 (Jul. 1990).

Winkler, W.E., "Record Linkage and Machine Learning," Virginia Tech (Nov. 1, 2001).

Winkler, William E., Presentation given at Virginia Tech on Nov. 1, 2002, entitled "Record Linkage and Machine Learning".

Yuhe Li et al., "Reducing Uncertainties in Data Mining," 1997, IEEE, 0-8186-8271-X/97, 97-105.

* cited by examiner

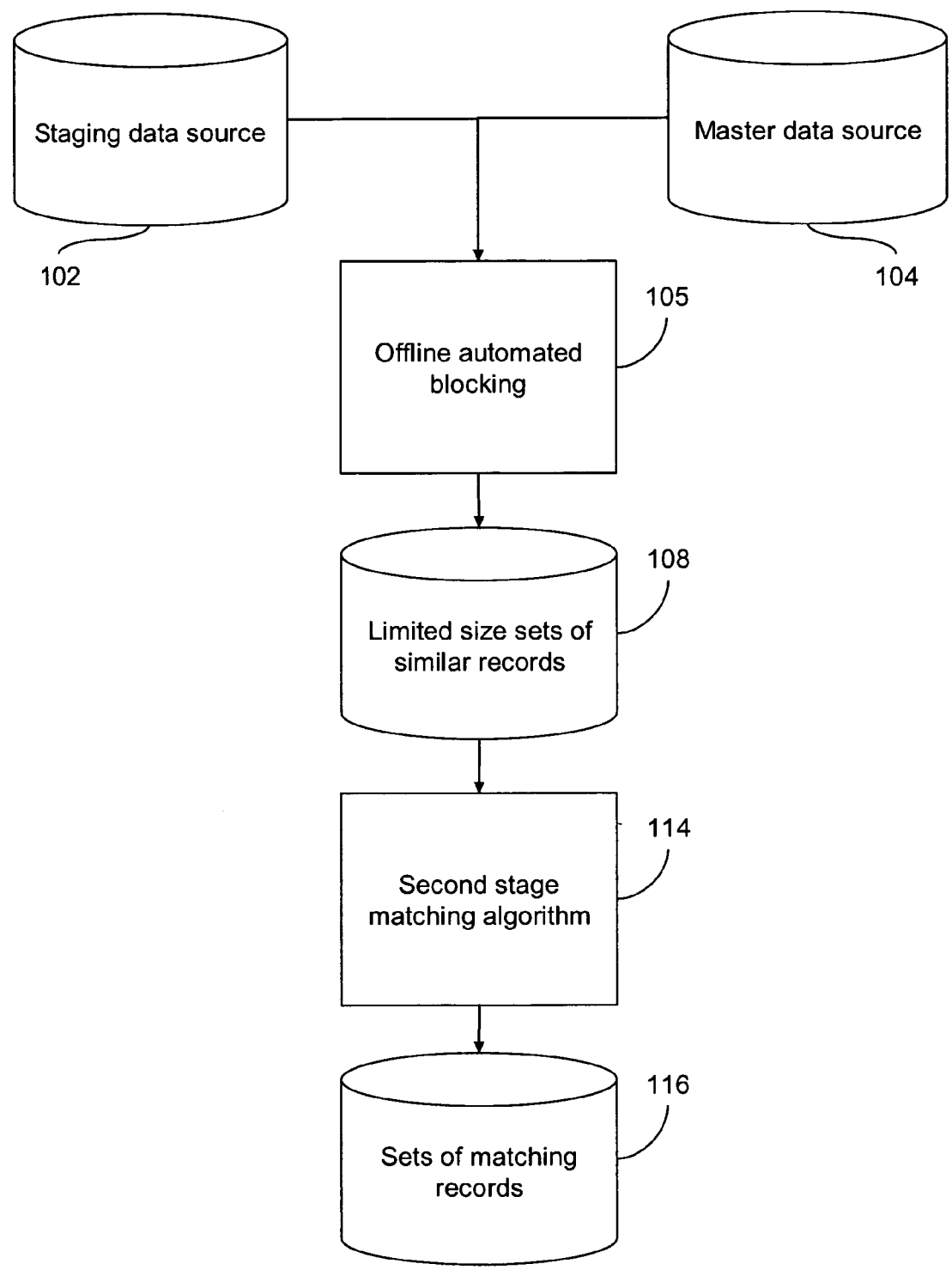
Figure 1: Example of non-limiting blocking and matching algorithm

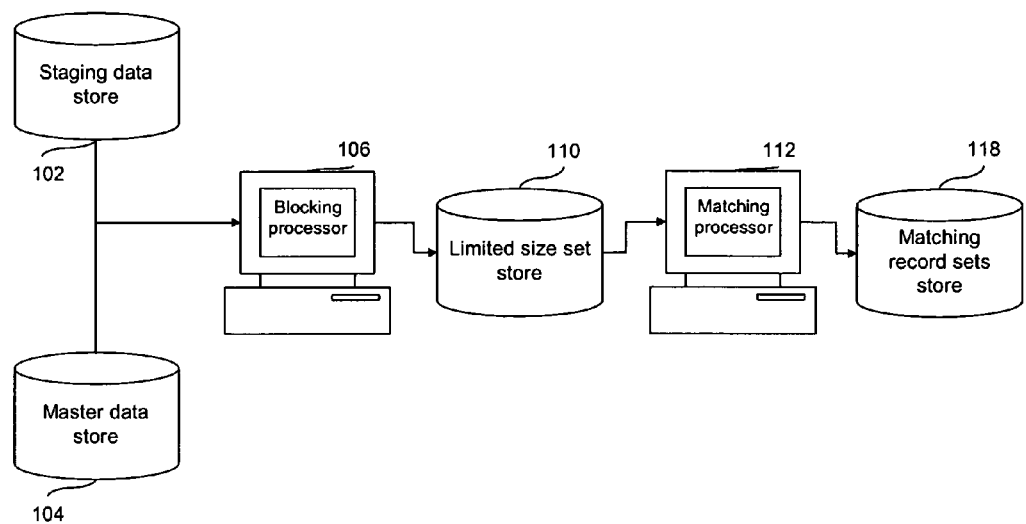
Figure 1A: Example of non-limiting blocking and matching algorithm with hardware implementation

| Names | | | | |
|---|---|---|---|---|
| ID | First | Last | Home | Work |
| 16 | Charles | Jones | 21 | 28 |
| 23 | Margaret | Drabble | 13 | 44 |

| Addresses | | | |
|---|---|---|---|
| ID | # | Street | City |
| 13 | 144 | Rubble St. | Cartoonland |
| 28 | 13b | Orchard Ln | Coventry |
| 21 | 45 | Charring Cross Rd. | London |
| 44 | 1 | Supermarket Ave. | Cartoonland |

| BloodTests | | |
|---|---|---|
| ID | Red cells | White cells |
| 110 | 6,000 | 700 |
| 201 | 80,000 | 1100 |
| 101 | 55,000 | 400 |

| Names_BloodTests | |
|---|---|
| Names_ID | BloodTests_ID |
| 16 | 110 |
| 23 | 201 |
| 16 | 101 |

Jones's record

| | | | BloodTests | | BloodTests | | Home Address | | | Work Address | | |
|---|---|---|---|---|---|---|---|---|---|---|---|---|
| ID | First | Last | Red cells | White cells | Red cells | White cells | # | Street | City | # | Street | City |
| 16 | Charles | Jones | 6,000 | 700 | 55,000 | 400 | 45 | Charring Cross Rd. | London | 13b | Orchard Ln | Coventry |

Figure 2: Example illustrative data source (people) and one record. Each person has one row in *Names*, up to two rows in *Addresses*, and multiple rows in *Blood tests*

```
create table ADDRESSES
(
    ADDRESSES_ID      NUMBER(8) NOT NULL,
    FIRSTLINE         VARCHAR2(60),
    SECONDLINE        VARCHAR2(60),
    CITY              VARCHAR2(60),
    STATE             NUMBER(5),
    ZIP               NUMBER(5),
    CONSTRAINT ADDRESSES_PK PRIMARY KEY (ADDRESSES_ID)
);

create table PEOPLE
(
    PERSON_ID         NUMBER(8) NOT NULL,
    FIRSTNAME         VARCHAR2(60),
    LASTNAME          VARCHAR2(60),
    DOB               DATE,
    HOME_ADDRESS_ID   NUMBER(8),
    WORK_ADDRESS_ID   NUMBER(8),
    CONSTRAINT PEOPLE_PK PRIMARY KEY (PERSON_ID),
    CONSTRAINT HOME_FK FOREIGN KEY (HOME_ADDRESS_ID) REFERENCES
    ADDRESSES (ADDRESSES_ID),
    CONSTRAINT WORK_FK FOREIGN KEY (WORK_ADDRESS_ID) REFERENCES
    ADDRESSES (ADDRESSES_ID)
);
```

Figure 3: Example database schema

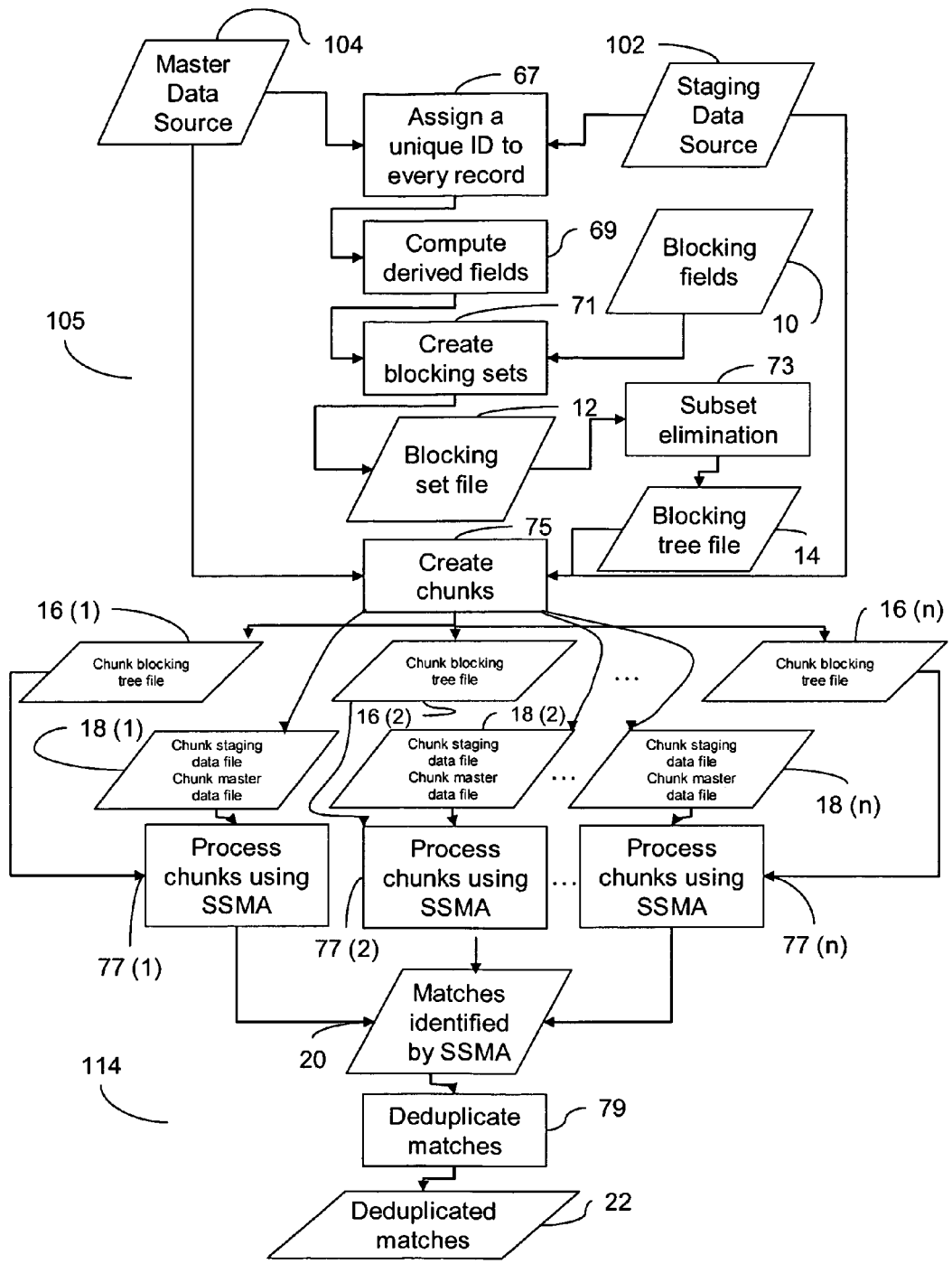
Figure 4: Detailed overview of example illustrative non-limiting process

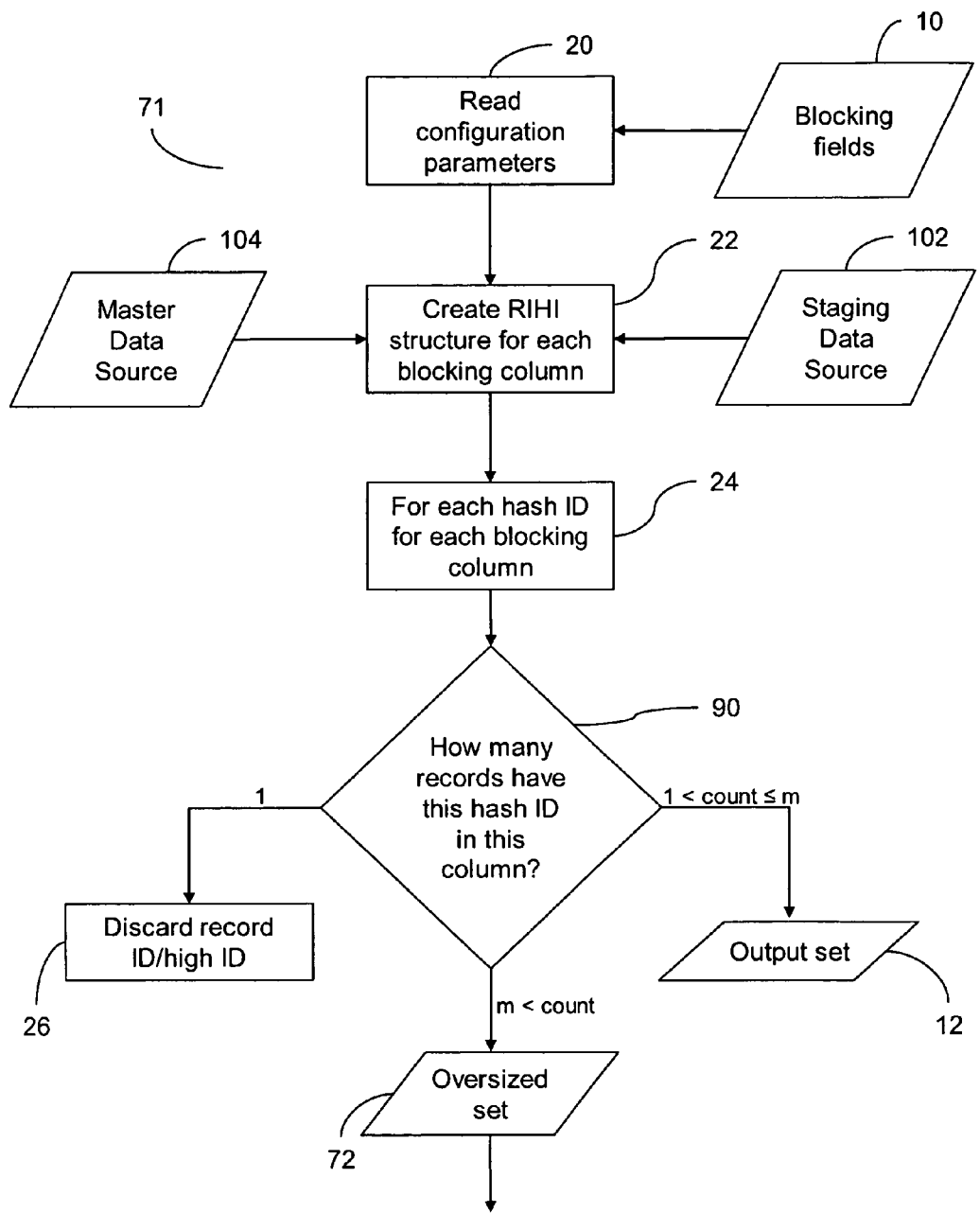
Figure 5: Expanded overview of Process 71 from Figure 4 (part one of two)

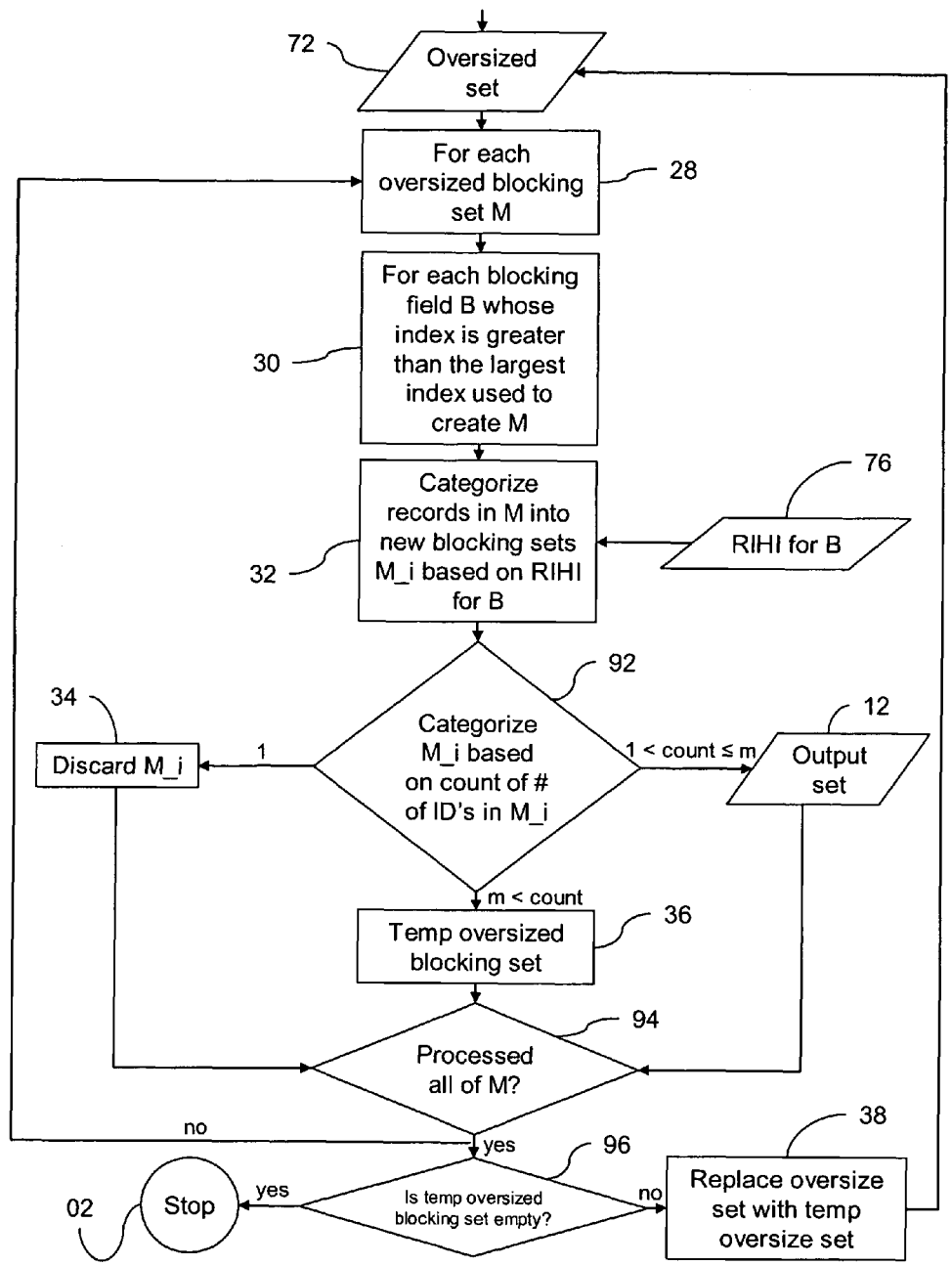
Figure 6: Expanded view of Process 71 from Figure 4 (part two of two, continuation of Figure 5)

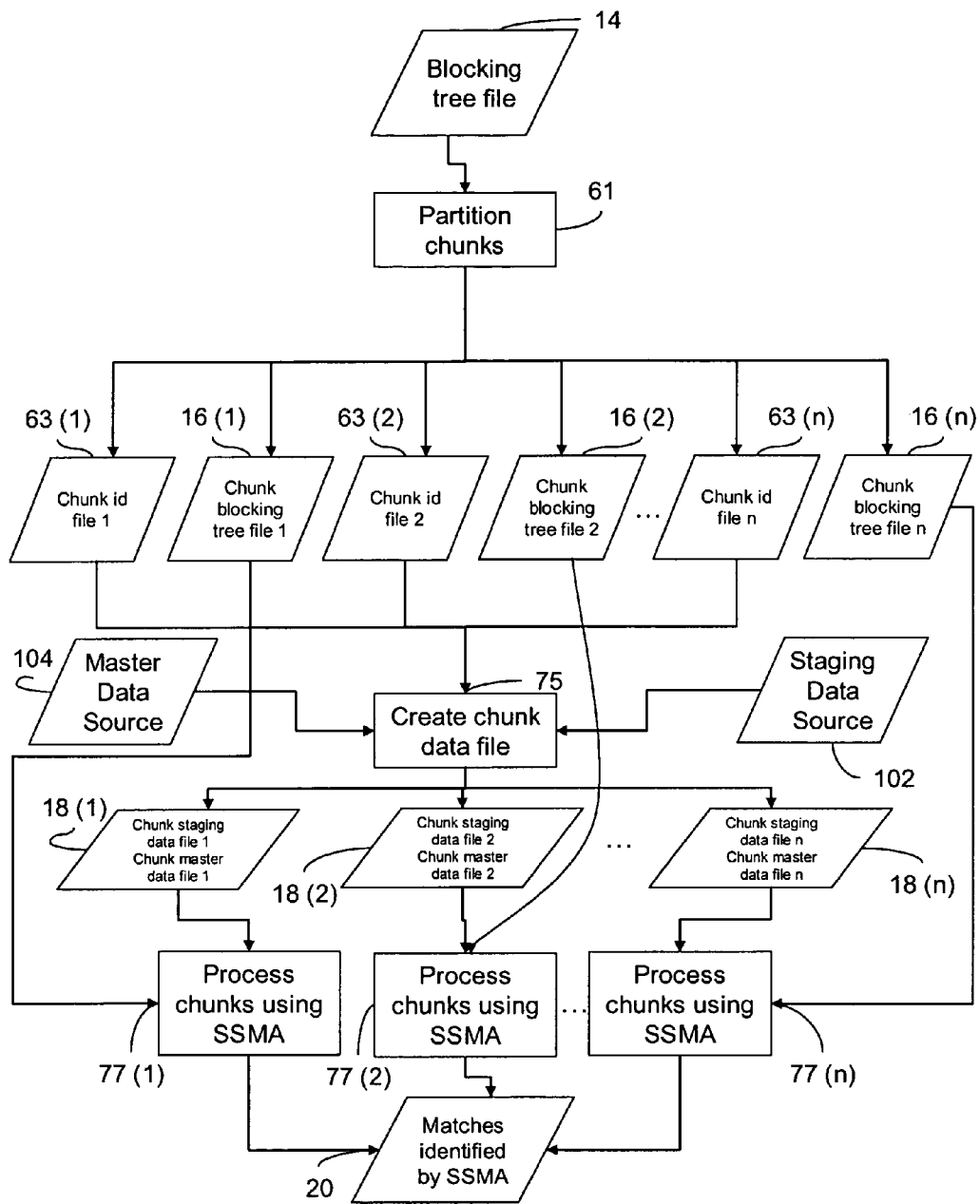
Figure 7: Expanded overview of Process 75 from Figure 4 (Create chunks)

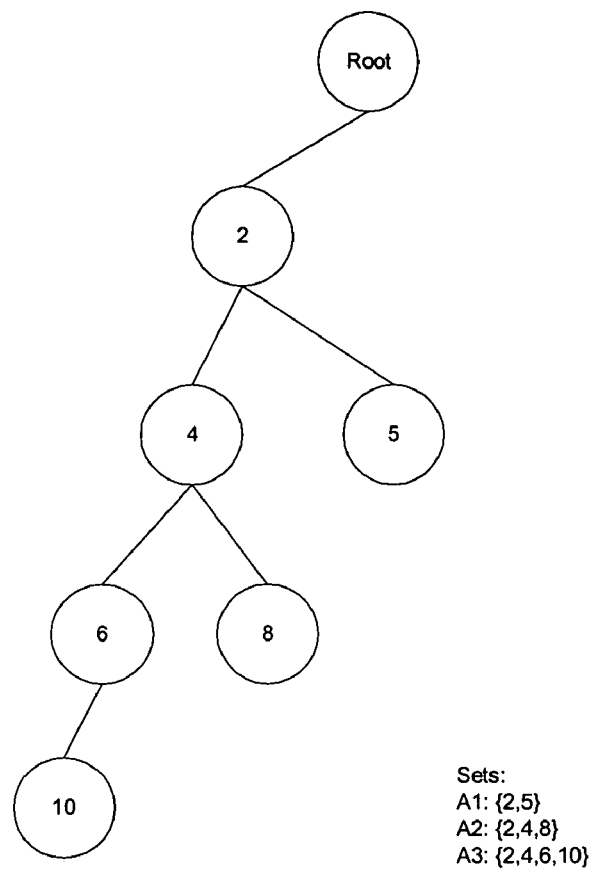
Figure 8: Result of adding sets A1, A2, and A3 to the suffix tree

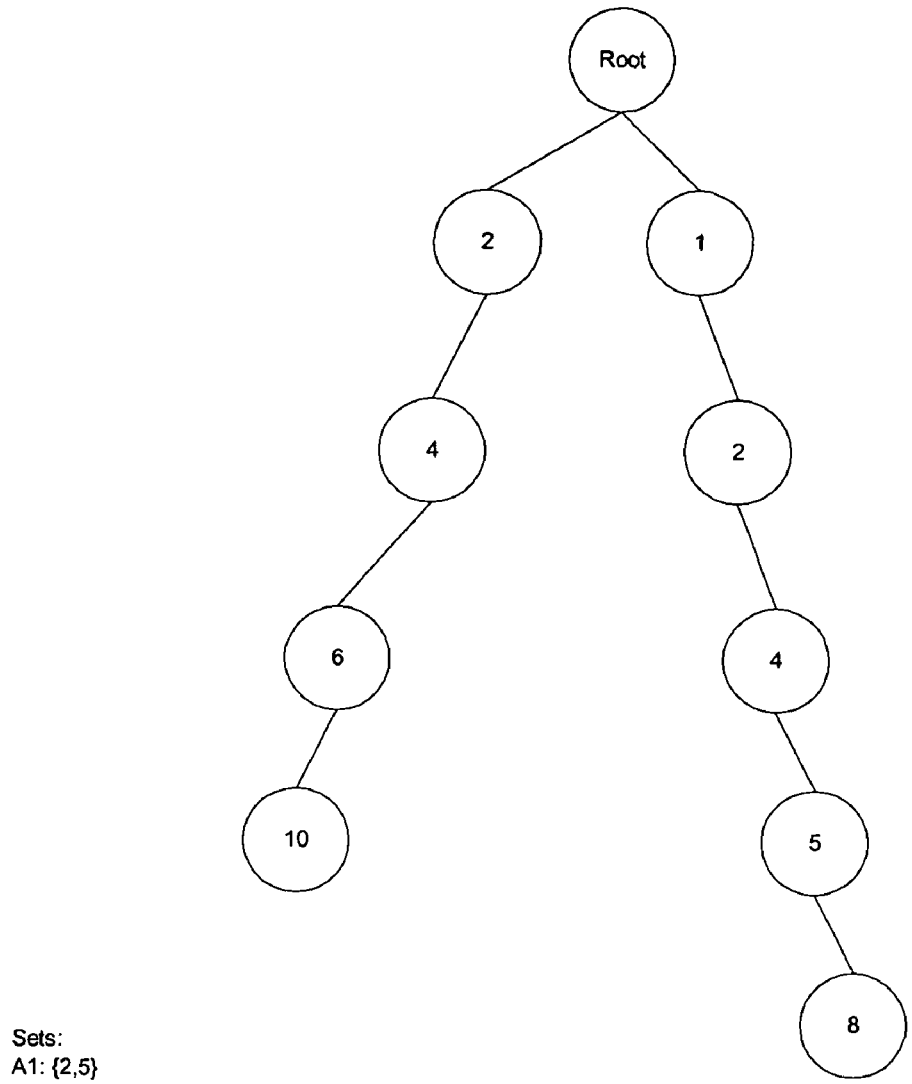
Figure 9: Result of adding set A4 to Figure 8

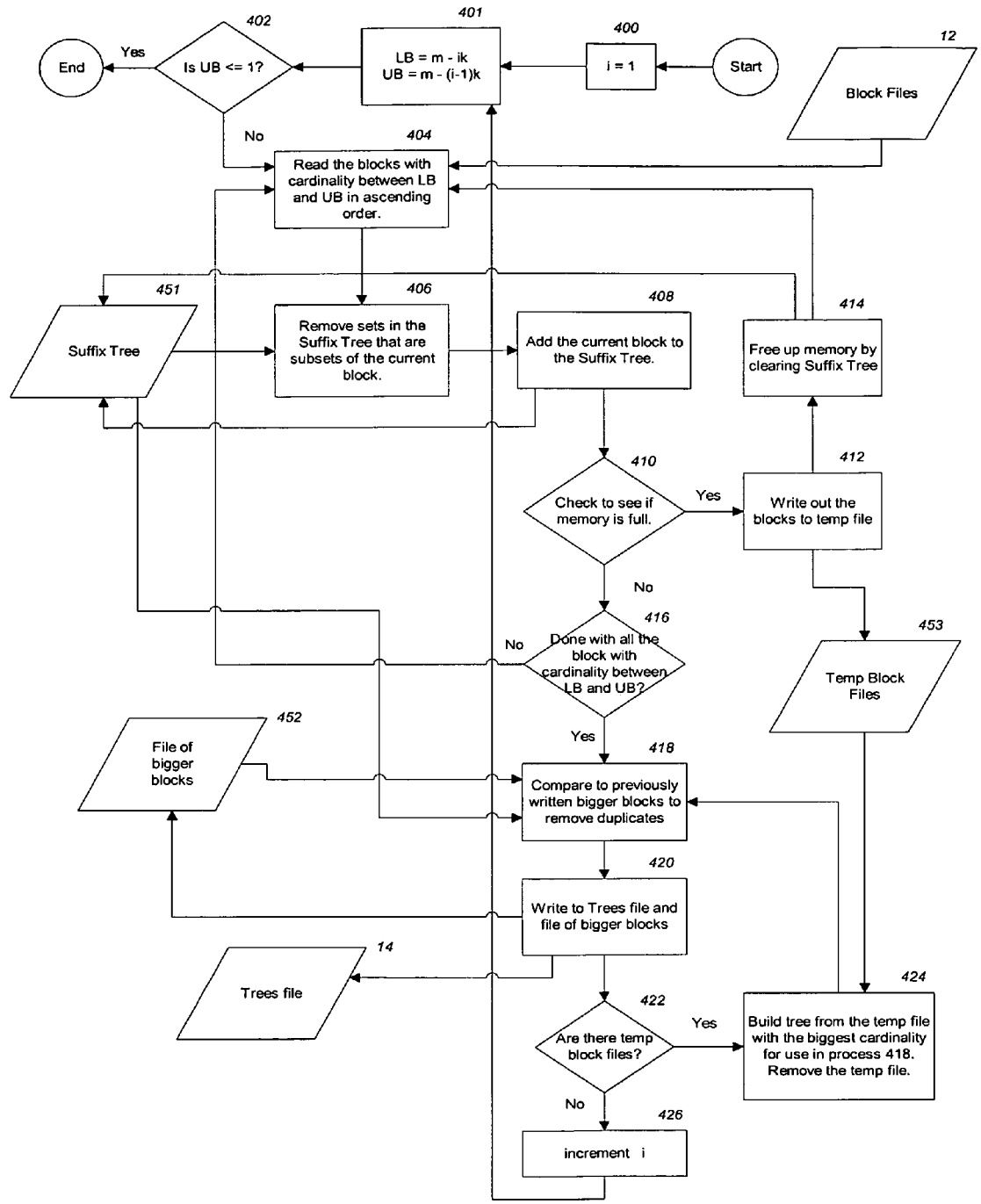
Figure 10: Expanded overview of Process 73 (Subset elimination) from Figure 4.

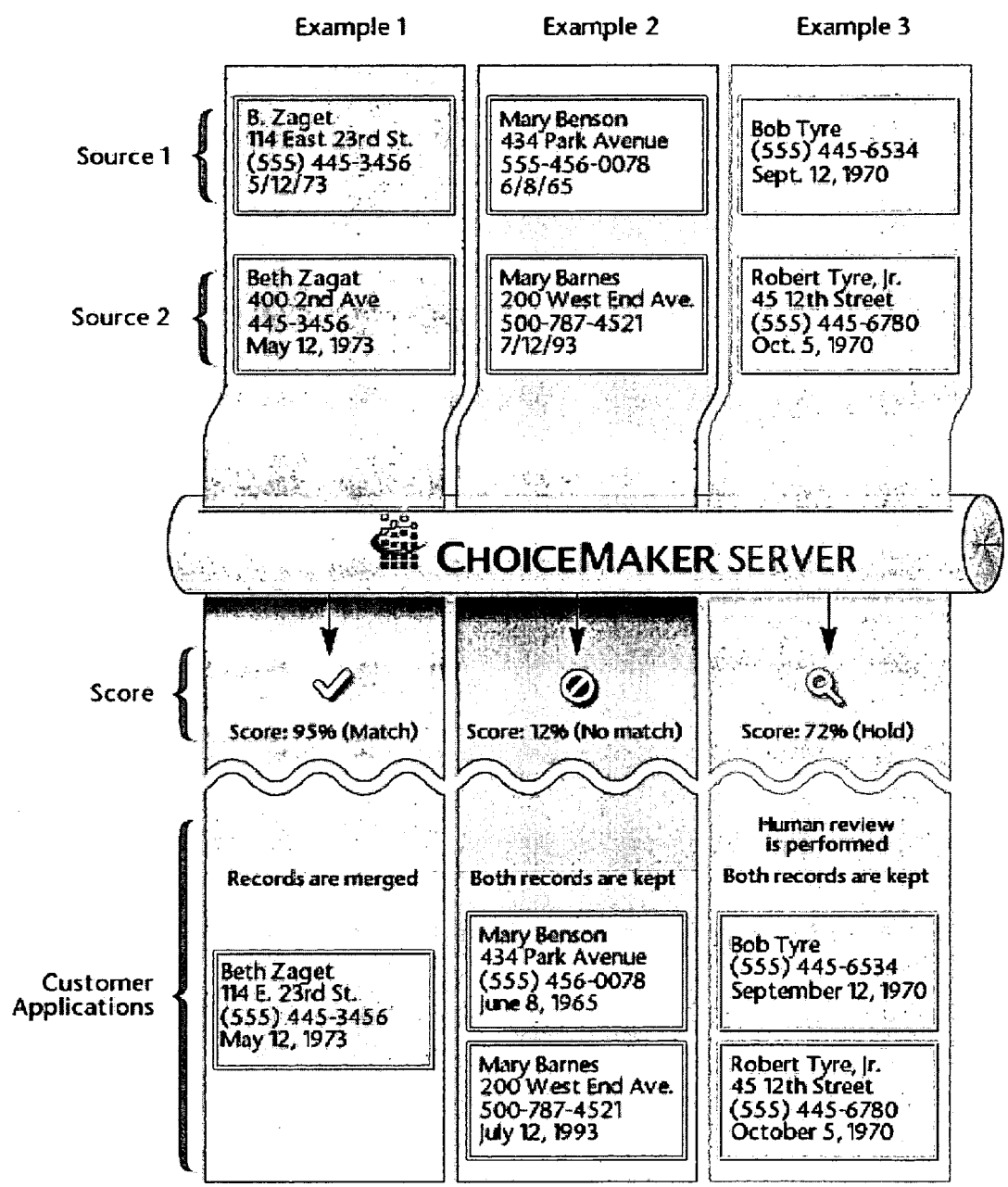
Figure 11: Example application

US 7,899,796 B1

BATCH AUTOMATED BLOCKING AND RECORD MATCHING

CROSS-REFERENCES TO RELATED APPLICATIONS

This application claims priority from U.S. Patent Application No. 60/630,034 filed Nov. 23, 2004 entitled "BATCH AUTOMATED BLOCKING AND RECORD MATCHING." This application is related to commonly assigned copending patent application Ser. No. 10/411,388 filed Apr. 11, 2003 entitled "AUTOMATED DATABASE BLOCKING AND RECORD MATCHING" and published on Jan. 29, 2004 under Publication No. US 2004-0019593. This application is also related to commonly-assigned U.S. Pat. No. 6,523,019. The entire contents of each of these prior disclosures are incorporated herein by reference.

FIELD

The technology herein relates to record matching, and more particularly to batch automated blocking and record matching.

BACKGROUND AND SUMMARY

Generally, blocking can be the first phase of record matching, as shown in FIG. 1. Blocking attempts to collect similar records. It takes the name 'blocking' because a group of similar records is called a 'block' of records.

Blocking is used to find approximately matching records in large data sets because the brute force approach of comparing each record with every other record would take too long (the complexity of this brute force approach grows as the square of the number of records in the data set).

FIG. 1 shows batch or "offline" blocking reading records from two data sources for the purpose of matching records in one data source against records in the other data source. As discussed below, batch blocking can also be run against a single data source to identify duplicate records in the source. Blocking outputs possibly matching sets of records, where the size of each set of records is limited by a configuration parameter. A more detailed, more computationally expensive matching process may then analyze all pairs of records within each set of possibly matching records. We call this matching process the Second Stage Matching Algorithm which we abbreviate "SSMA."

Generally speaking, the goal of blocking is to find as many potentially matching records as possible while not returning so many potential matches that the speed of downstream data retrieval and scoring suffers. More formally, blocking minimizes the number of missed matches (false negatives) while limiting the number of potential matches it returns.

The technology herein provides new technologies for batch, or offline, blocking. These technologies take a set of records and generate sets or blocks of potentially matching records for the entire set. The blocks of potential matches are then passed to the SSMA to evaluate which records match.

Exemplary Non-Limiting Features:
Fully customizable for any data
Requires very little user customization: Just define what fields to use for blocking and run it
User can easily specify their preferred tradeoff between faster performance on the one hand and achieving a very low rate of missed matches on the other hand
Requires no special knowledge of the database
Works across subject-matter domains: people, companies, products, financial securities, etc.
Does not require a relational database. Works on, among others, flat file, XML, and relational database inputs
Can make use of multiple machines to speed processing
Exemplary Non-Limiting Benefits
High Speed. Perform fast record matching between large databases or between a moderate size input dataset and a large database
Accuracy. Get results that will mimic an expert's decisions.
Flexibility. Match on any subject matter, including people, financial securities, companies, and products.
Auditability. Simple fundamental algorithm is easy to describe to clients, enabling transparency of the system's decisions.
Match any kind of data.
Build systems customized to particular matching needs.
Make optimum business decisions with more reliable and valid data.
Remove duplicate records from databases to assure high quality data. This provides benefits for public health registries; district, state, or federal K-12 school enrollment databases; communicable disease surveillance systems; voter registration roles; and many other applications
Link databases to facilitate data analysis. The has applications for marketing (link a database of business prospects with a database purchased from another company), counter-terrorism (link airline passengers with a list of possible terrorists), and many other fields

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 1 is an exemplary flowchart showing example non-limiting implementation of batch or "offline" blocking;

FIG. 1A is an exemplary illustrative non-limiting implementation of an example record matching system FIG. 2 shows an exemplary non-limiting data source and one record;

FIG. 3 shows an example non-limiting Database Schema;

FIG. 4 is a flowchart of an exemplary non-limiting detailed implementation of an offline blocking and matching process;

FIGS. 5 and 6 together are a flowchart of an exemplary non-limiting expanded implementation of a "Create Blocking Sets" algorithm;

FIG. 7 is a flowchart of an exemplary non-limiting expanded implementation of a "Create Chunks" algorithm (process 75);

FIG. 8 is an example of a suffix tree;

FIG. 9 is an example of the result of adding a new set to FIG. 8;

FIG. 10 is a flowchart of an exemplary non-limiting expanded implementation of a "Subset Elimination" process of FIG. 4; and FIG. 11 shows an example practical record matching application.

DETAILED DESCRIPTION

FIG. 1 shows an example flowchart of an exemplary illustrative non-limiting implementation of a record matching process, and FIG. 1A shows an exemplary illustrative non-limiting implementation of an example record matching system. In the exemplary illustrative non-limiting process shown in FIG. 1, a staging data source 102 and a master data source 104 provide staging data and master data, respectively, to an offline automated blocking process 105 performed by a blocking processor 106. In the example shown, staging data source 102 and master data source 104 may comprise any convenient type of mass or other storage device including but not limited to optical disk, magnetic disk, flash memory, magnetic tape or other storage device. The blocking processor 106 may comprise one or more computers such as for example a personal computer, a minicomputer, a main frame computer, web server or any desired computing platform capable of performing the exemplary illustrative non-limiting offline automated blocking process 104. Blocking process 105 running on associated blocking processor 106 output limited sized sets of similar records 108 that may be stored on a limited sized set store 110. Store 110 may comprise any desired data storage device including but not limited to the mass storage devices described above.

In the exemplary illustrative non-limiting implementation, a matching processor 112 performing a second stage matching algorithm 114 accesses the limited sized sets of similar records 108 stored on the limited sized set store 110, and performs a second stage matching algorithm that provides a more detailed record matching function. In the example shown in FIG. 1A, the blocking processor 106 and the matching processor 112 are shown as different processors or computers. However, the same computer may be used to perform both the blocking process 105 and the matching algorithm 114. The second stage matching algorithm 114 outputs sets of matching records 116 which may be stored on a matching records sets store 118. The resulting matching record sets may be used in any of a number of different ways. For example, the matching records sets may be further processed to reconcile original data to de-duplicate a database, or printed out as a report, or displayed on a display screen, or analyzed to provide useful statistics, or used in any of a variety of other ways.

Exemplary non-limiting batch blocking inputs data from two sources: (1) A "staging" data source 102, and (2) a "master" data source 104. The exemplary non-limiting algorithm makes no assumptions about the format of the data in either source. For example, either data source could be XML, a flat file, a relational database or some other format. Without loss of generality, the exemplary algorithm may make the assumption that the staging data source may contain internal duplicates and the master data source is free of duplicates.

In more detail, exemplary illustrative blocking matches records in the following ways:
1) Among records in the staging data source, and
2) Between records in the master data source and records in the staging data source.

If the master data source is empty, then blocking simply finds sets of similar records in the staging data source.

Exemplary illustrative blocking is evaluated on the following criteria:
Speed
False negatives, or the rate at which records that are actually similar do not appear in the same block
The number of comparisons that the blocking algorithm requires the SSMA to make. This is related to the number of false positives, or the rate at which records that are not actually similar appear in the same block.

Generally, false positives are primarily a performance issue and not an accuracy issue for blocking. In one exemplary illustrative non-limiting implementation, it is the responsibility of the SSMA to eliminate false positives from blocks returned by the matching algorithm. False positives in blocking slow down overall matching performance but do not generally increase the error rate since the more detailed matching process eliminates them from final results.

See commonly assigned U.S. patent application Ser. No. 10/411,388 (published as 2004/0019593) for an example 'online' blocking algorithm. The exemplary illustrative non-limiting "offline" algorithm described herein offers roughly equivalent performance in terms of false negatives and false positives to the "online" algorithm, but provides additional advantages in terms of processing large data sources. Exemplary illustrative non-limiting offline blocking contrasts with online blocking in the following ways. First, the interface for online blocking is different. Online blocking takes one record and a data set and finds all records in the data set that might match the record. The second difference is that offline blocking does not require any random access to the database. All steps of the algorithm can be accomplished via sequential reads of master and staging data sources. The term "offline" does not mean or imply that the exemplary illustrative non-limiting algorithm cannot be employed in an "online" context such as a web server, networked application or the like. We are using the definition of the terms in computer science algorithms where, when given n operations to perform, an "offline" algorithm can perform all n operations in any sequence or in parallel, whereas an "online" algorithm may perform the operations in the sequence in which they were presented to the algorithm. Offline algorithms can thus sometimes gain greater efficiency than their online cousins.

This sequential rather than random access to the database is useful in two ways. First, it means that the algorithm does not require a relational database (such as Oracle, for instance) to be implemented—although one could be used if desired. Second, for a database of size n, doing a single sequential reads of all n records can be orders of magnitude faster than doing n random accesses to the database.

"Offline" blocking (which could also be called "batch blocking") offers very fast performance when the staging data source 102 (as defined above) is relatively large. On the other hand, "online" blocking may be superior when the staging data source is small (experimentally, less than 1000 records for the staging data source when the master data source has a size of roughly two million) or when we are processing a single input, or "query" record. In particular, when processing a single query record, the "online" algorithm offers "real-time" response, which the "offline" algorithm may not. Note, however, that an online algorithm uses a database which can support random access, so batch blocking is likely to be superior even for small databases if neither of the data sources is contained in a relational database.

Exemplary Illustrative Non-Limiting Offline Blocking and Matching Process

FIG. 4 is a flowchart of an exemplary illustrative non-limiting overall implementation of an offline automated blocking process 105 and a second stage matching algorithm 114. As shown in FIG. 4, a master data source 104 and staging data source 102 are both input to a process block 67 that assigns a unique identifier to each record. The exemplary illustrative non-limiting algorithm next computes derived fields 69 and uses blocking fields 10 to create blocking sets (block 71). The resulting blocking set file 12 may be further processed to eliminate subsets (block 73) to provide a blocking tree file 14.

In the exemplary illustrative non-limiting implementation shown, the master data source 104 and staging data source 102 are further processed by block 75 to create "chunks"

using the blocking tree file 14 as additional input. The "create chunks" block 75 provides a chunk blocking tree file 16 and a chunk staging data file/chunk master data file 18 that are both used to process chunks using the SSMA matching algorithm 77. The matches identified by SSMA (block 20) are de-duplicated (block 79) to provide a set of de-duplicated matches 22.

Example Usage

The exemplary illustrative offline blocking inputs some configuration information and data and outputs blocks containing records that might match.

Example Input

The exemplary illustrative offline blocking reads one or two data sources.

Example 'Record'

Blocking can match data representing anything, such as people, transactions, addresses or corporations. We call the thing that blocking matches the record. This reflects our preference for the terminology of the data quality community where the literature refers to the broad problem we are trying to solve as "record matching" as opposed to the terminology of the database community which uses the term "record" to refer to an entry in a single database table. In this document, we use the term "row" to describe an individual table entry. The information describing a record may be spread across multiple files or tables. See FIG. 2.

Example Duplicated Records

In the exemplary illustrative non-limiting implementation, a data source may contain duplicated records, i.e., multiple records that represent the same thing or person. Alternatively, a data source may have had its duplicate records removed, that is, it may already be 'deduplicated'. In the latter case, as noted above, the exemplary non-limiting offline blocking will not look for matches within the data source. This is implemented as noted in Table 1.

More than two data sources may be processed by this exemplary method. First combine all undeduplicated data sources (if any) into one single data source and process it against the deduplicated database using the method described herein. Next, sequentially match all pairs of deduplicated databases which need to be matched against each other using the method.

TABLE 1

Blocking Sets Constructed When There Are Two Data Sources, and Some May Already Be Deduplicated

| Number of data sources already deduplicated | Exemplary Illustrative Non-Limiting (to scope of patent protection) Processing constraint |
|---|---|
| 1 | A blocking set must contain at least one record from the data source that is not deduped (the staging data source). Example: Load new data into an already deduplicated database. |
| 2 | A blocking set must contain at least one record from each data source. Example: Link two databases that have already been deduplicated. |

Example Input Data Representation

In the exemplary illustrative non-limiting implementation, a data source may be represented as either a 'flat' file or as one or more database tables. If a data source is a 'flat' file, then some description may indicate how the file is organized: how records from one or more tables and their fields are indicated. Valid descriptions include:

The file's XML structure describes the data.

Each line in the file is a record, and fields are indicated by a delimiter.

If the data source is some database tables then the data is described by the tables' SQL DDL, or schema.

Record Structure

If the exemplary illustrative non-limiting data source is multiple database tables, then the data is only partly described by the tables' SQL DDL. The exemplary illustrative non-limiting offline blocking technique also needs to know how the tables are combined into a single record that can be matched. For example, suppose the database has two tables: PEOPLE and ADDRESSES, with the partial schema in FIG. 3.

Assume that we want to find people that might match. Blocking will do this by comparing fields in PEOPLE rows, and also comparing fields in their home and work addresses. While the structure of a record is relatively elementary for the schema in FIG. 3, more complex schemas can have multiple interpretations of the structure of the record being compared. Therefore, blocking may be provided with a description of the record, called the record's 'schema'.

Example Record ID

Since a blocking record may involve data from multiple tables—as shown in the example with people and their addresses in FIG. 3—one of the tables is identified as the base table. For example, PEOPLE is the base table in this example.

In the non-limiting example shown, each record contains exactly one row from the base table. All other data rows that comprise the record come from tables that reference or are referenced by, either directly or indirectly, the row from the base table. Whatever the representation of the data, each record should optimally be identified by a dense (contiguous integers for the records in the base table) unique identifier, or record ID (at times we will refer to the record ID as simply 'the ID'—this usage should be obvious from the context). If a suitable ID already exists in the base table, then offline blocking will use that ID. Otherwise, process 67 of FIG. 4 will create an ID. The ID is described in the blocking configuration.

Example Derived Fields

If offline blocking is configured to include blocking on derived fields (see Table 2), then the values of the derived fields are computed right after unique id assignment (process 69 of FIG. 4). An example of a derived field is that frequently it is desirable to block on the Soundex value of last name rather than on the last name itself because the Soundex value is more robust in the face of spelling errors.

Example Blocking Set Output

There are two major possible representations of the output of the "Create Blocking Sets" (Process 71) step. First, the output's organization may vary, as follows.

| Organization | Description |
|---|---|
| Blocking sets | Each set of possibly matching records is output as a set of ID's. Subsets may be removed. For example, the example in Table 3 would be represented like this.<br>1, 4, 5<br>1, 3, 4<br>2, 6, 8 |

-continued

| Organization | Description |
|---|---|
| Matching pairs | Every possible pair of matching records is output, one per row of a file. Optionally, all duplicate pairs of potentially matching records can be removed from the output. For example, the example in Table 3 would be represented like this.<br><br>| 1 | 3 |<br>| 1 | 4 |<br>| 1 | 5 |<br>| 2 | 6 |<br>| 2 | 8 |<br>| 3 | 4 |<br>| 4 | 5 |<br>| 6 | 8 |<br><br>A 'blocking sets' representation will take less space than a 'matching pairs' representation. Specifically, if there were b blocking sets and each had e elements a 'blocking sets' representation would take O(be) space whereas a 'matching pairs' representation would take $O(be^2)$ space. |

Note also that batch blocking generally outputs all of the record data associated with each id (File 18) along with one of the above two output representations in the create chunks step (Step 75). This is done in the example shown so as to ensure that the processing of the blocks using the SSMA does not require random access to retrieve the data. However, if it is desired that the data should be retrieved from a database using random access, then the blocking algorithm does not need to output the record data and File 18 could be omitted.

Example Chunking

In general, it is desirable to divide either blocking set or matching pair outputs into "chunks", sets of blocking sets or matching pairs divided up such that all the records listed in a chunk can fit into the main memory of a single machine. Although chunking is helpful regardless of whether scoring will be done by single or multiple machines, chunking also facilitates parallel scoring by multiple computers. Each scoring computer is sent its chunk to match. This process is discussed in below beginning with the section entitled "Chunking".

Summary

To summarize, the output of the stages leading up to the stage in which we actually find matching pairs using the SSMA (Process 20) is configured by three parameters:

| Parameter | Values |
|---|---|
| Organization | 'Blocking sets' or 'Matching pairs' |
| Output record data | On or off |
| Chunked | On or off |

In the example non-limiting implementation, the use of chunking implies that the output of the first stage is organized according to blocking sets and that record data is output. In general, the non-limiting examples described below will assume that these parameters are set in this way.

Example Configuration

Offline blocking is deployed by having the administrator configure several parameters. Some of these parameters are discussed in other sections, but we collect them all here, organized generally by the order in which they're used.

TABLE 2

Example Non-Limiting Configuration Parameters

| Parameter | Reference Section | Description |
|---|---|---|
| Schema | Record Structure | If needed, a description of a record's structure in multiple tables or files. |
| 'm' | | The maximum number of records allowed in a blocking set. This number is constrained to limit the work that should be done by the scoring phase of matching in Process 77, particularly in the loading and scoring of record pairs. Note that the number of pairwise comparisons needed to process a blocking set grows proportional to the square of m. A typical value for m is 50 or 100. The preferred implementation makes use of a fixed m, as noted above. However, in an alternate implementation m could be a heuristic where, for instance, processes 90 and 92 could designate blocking sets to be either oversized or not based on the number of records in the blocking set as well as on other factors, such as the number of fields used to create the blocking set or which fields were used to create the blocking set. |
| Blocking fields | | The fields that blocking uses to consider whether records match. For example, firstName, lastName, and zip might be selected. In this case, a set of records that match on lastName would be output, as long as the size of the set did not exceed m. Note that every field in the schema does not need to be used for blocking. Some fields like "Gender", for instance, might be insufficiently selective to warrant inclusion in blocking, although they could still be used by the SSMA.<br>Some of the blocking fields may be simple functions of the values in other fields. Such fields are called derived fields. For example, the sum of the digits in a phone number or date field could be a useful derived field because it would match even if the digits had been permuted.<br>Dependant fields and swapped or moved fields may also be configured. |
| Input data | Input Data Representation | Parameters that describe the input data. For each data source the following is required:<br>Information on how to access the data<br>Whether the data source is already deduplicated |

TABLE 2-continued

Example Non-Limiting Configuration Parameters

| Parameter | Reference Section | Description |
|---|---|---|
| k | Example Subset Elimination: Low Memory Considerations | This parameter determines the size of the range of cardinality that we will process in each iteration of subset elimination (Process 73). At every iteration of the example implementation of the algorithm, we will process sets which have cardinality between i and i + k . A typical value for k is 5. |
| Maximum chunk size | Partition Blocking Trees Into Chunks | The number of records that are allowed in a chunk. This number should be set no larger than the number of records which will fit into the available RAM on the machines which will process each chunk using the SSMA. |
| Max Chunk Files | Example Working With Limited Number of File Handles in Chunking | Maximum number of chunk files that the system is allowed to write at one time. In the example implementation, this variable is generally set to slightly less than half the operating system's capacity for the maximum open file handles. 500 is a common value in the example non-limiting implementation. |
| Max Pairs | Example Process Chunks and Find Matching Pairs | Maximum number of pairs to hold in memory at one time when removing duplicate matching pairs in Process 79 of FIG. 4. |
| Blocking output representation | Blocking Set Output | Example: "Blocking sets" or "matching pairs" |
| Min fields for oversized blocking | Oversized Blocking Sets | Minimum number of blocking fields required for an oversized blocking set to be processed using the methodology of the section entitled "Oversized Blocking Sets" |
| Max Oversized | Oversize Blocking Sets: The first step | Maximum size allowed for an oversized block. |

Example Approach

In this section we illustrate an example of the system's operation on the data source shown in Table 3. We assume that the data source contains a flat file or a single database table, that the ID field in the table is the record ID, and that all the other fields in the table are blocking fields.

TABLE 3

Example data source

| ID | First | Last | DOB | Phone | Zip |
|---|---|---|---|---|---|
| 1 | Arthur | Goldberg | Mar. 4, 1955 | 212 685-2961 | 10016 |
| 2 | John | Miller | Apr. 5, 1966 | 646.526.5000 | 10010 |
| 3 | Arthur | Goldburg | Mar. 4, 1955 | 212 685-2691 | 10016 |
| 4 | Arthur | Goldberg | Jun. 7, 1915 | 212 685-2691 | 10016 |
| 5 | Arthur | Goldberg | Jun. 7, 1915 | | 10016 |
| 6 | Jon | Muller | Jul. 8, 1966 | 646 526-5000 | 10010 |
| 7 | Sally | Strothers | Jan. 2, 1996 | | 10010 |
| 8 | John | Miller | | 646 526-5000 | 10010 |

The offline blocking algorithm is optimized to achieve high performance with large data sources. It involves these example non-limiting phases:

1) Create blocking sets: create sets of record ID's which identify records that match on one or more blocking fields. A set contains fewer than m records.
2) Create chunks: Divide the list of blocking sets into chunks, each of which contains few enough potentially matching records to be processed in memory by a single machine. Write out the data for each chunk so that it can be quickly read in by the next step. The size of chunks is limited, so that a chunk can fit in memory and the SSMA can rapidly analyze possible matches. Chunking is described in the section labeled as "Chunking" below.
3) Process chunks and find matching pairs: Although not strictly a part of blocking, we also document here how the chunks are processed and matching pairs of records are identified. This phase is described in the below section "Process Chunks and Find Matching Pairs".

The create blocking sets phase is decomposed further as follows:
a) Read the configuration parameters.
b) For each blocking field, initialize a table that will relate Record ID to field value. We call this structure the record-id/hash-id table.
c) Sequentially read the input data in one pass. Examine each record. For a given record, examine each blocking field.
   i) For a given blocking field, insert the pair (the record's ID, the hash of the field's value) into the field's record-id/hash-id table. (If a blocking field is of type integer, hashing is unnecessary and the integer values are used directly.) In an alternate implementation, one can build an inverted index for each column, but simply using hash values is generally sufficient because collisions of hash values will only cause a small number of false positives, which are acceptable in a blocking algorithm.
d) Write each record-id/hash-id table to a file.

For example, consider the Java hash values of the data used in the examples:

| Name | Hash value |
|---|---|
| Arthur | 1,969,735,650 |
| John | 2,314,539 |
| Jon | 74,665 |
| Sally | 79,649,227 |

Then the record-id/hash-id (RIHI) file for First would be as follows:

TABLE 4

Record-ID/Hash-ID table for first name

| Record Id | Hash |
|---|---|
| 1 | 1,969,735,650 |
| 2 | 2,314,539 |
| 3 | 1,969,735,650 |

TABLE 4-continued

Record-ID/Hash-ID table for first name

| Record Id | Hash |
|---|---|
| 4 | 1,969,735,650 |
| 5 | 1,969,735,650 |
| 6 | 74,665 |
| 7 | 79,649,227 |
| 8 | 2,314,539 |

4) Create sets of similar records: this is the heart of the algorithm, which we describe separately below.

5) Eliminate subsets: blocking sets that are subsets of other blocking sets are completely redundant. This optional step eliminates them. It is described below starting with the section labeled "Subset Elimination".

Introduction to Exemplary Create Blocking Sets Phase

FIG. 5 shows a more detailed exemplary illustrative non-limiting implementation of the FIG. 4 "create blocking sets" process 71. In the example shown, blocking fields 10 are input to a "read configuration parameters" block 20 which provides configuration parameters to create an RIHI structure for each blocking column (block 22) based on the master data source 104 and the staging data source 102. Then, for each hash ID for each blocking column (block 24), the exemplary illustrative non-limiting algorithm asks "how many records have this hash ID in this column?" [decision block 90]. The exemplary illustrative non-limiting implementation discards record/ID/high ID (block 26), generates an oversized set 72 if m<count, and generates an output set 12 if 1<count≦m.

Referring now to FIG. 6, the oversized set 72 may be iteratively processed by repeating exemplary illustrative non-limiting steps for each oversize blocking set M (block 28). For each blocking field B whose index is greater than the largest index used to create M (block 30), the exemplary illustrative non-limiting implementation categorizes records M into new blocking sets M_i based on RIHI for B (block 32)—accepting RIHI for B file 76 as in input. The exemplary illustrative non-limiting implementation of the algorithm may then categorize M_i based on count of # of ID's and M_i (decision block 92). The exemplary illustrative non-limiting algorithm may discard M_i if the count is =1 (block 34); may create a temporary oversized blocking set if m<count (block 36); and may create an output set 12 if 1<count≦m. This process is repeated until all of M has been processed (decision block 94), at which time a further test determines whether the temporary oversized blocking set is empty (decision block 96). If the temporary oversized blocking set is empty ("yes" to decision block 96), the exemplary illustrative non-limiting implementation stops processing (bubble 02). Otherwise, the exemplary illustrative non-limiting implementation may replace the oversize set with the temporary oversize set (block 38) and iteratively repeat the steps described above.

An exemplary constraint of the illustrative non-limiting example implementation of component 71 of FIG. 4, which is illustrated in further detail in FIG. 5 and FIG. 6, is that no set of similar records can contain more than m records (m is defined in Table 2). In this context, a set of similar records can very likely be broken into multiple sets that are smaller by categorizing the records according to the value of another blocking field.

An example will help illustrate this.

Create Sets of Similar Records Examples

One Data Source

For purposes of illustration, we set the maximum blocking set size m to 3. The following sets of records from Table 3 match on one field:

| Field | Records | Set size exceeds m |
|---|---|---|
| First | 1, 3, 4, 5 | X |
| First | 2, 8 | |
| Last | 1, 4, 5 | |
| Last | 2, 8 | |
| DOB | 1, 3 | |
| DOB | 4, 5 | |
| Phone | 1, 3, 4 | |
| Phone | 2, 6, 8 | |
| Zip | 1, 3, 4, 5 | X |
| Zip | 2, 6, 7, 8 | X |

Offline blocking takes the 3 blocking sets whose size exceeds m, adds another field, and reevaluates the match. Only fields that come after the existing blocking fields in the list of fields should be added. These fields are said to follow the existing fields. Restricting the match to following fields prevents the algorithm from trying to match on a given set of fields more than once. We give a proof below.

Focus on the set of sets of blocking fields in the blocking sets. We prove by induction on the number of fields in each set of blocking fields, i.

Base case, i=1: Initially, the set of sets of blocking fields is $\{\{1\}, \{2\}, \ldots, \{|B|\}\}$ and all sets of blocking fields are distinct.

Induction step: The rule is that at each step each set of blocking fields may add only a blocking field that comes later in the list, that is, a field with an index larger than the largest blocking field index in the set. For example (assuming 1<|B|) the first set may add |B| to become {1, |B|}. Consider 2 cases:

Case 1: A given set of blocking fields: A given set of blocking fields is not the source for two sets of blocking fields that are the same because a field is added to the given set only once.

Case 2: Two different sets of blocking fields: Consider the sets A1 and A2. Let L(A1) denote the largest blocking field index in A1, and similarly for A2. WLG let L(A1) ≦L(A2). Consider 2 cases:

Case a: L(A1)=L(A2): adding one more field to both A1 and A2 cannot make them the same because they differ for blocking field indexes less than L(A1) and the field added has a blocking field index>L(A1).

Case b: L(A1)<L(A2): the field that is added to A2 cannot have the index L(A1) so the resulting sets are distinct.

(End of Proof)

Because Zip is the last field, there are no following fields and the last 2 blocking sets created on matching Zip values are dropped. Thus redundant blocking sets using the fields $_{First, Zip}$ and $_{Zip, First}$ are not created.

| Fields | Records | Set size exceeds m |
|---|---|---|
| First, Last | 1, 4, 5 | |
| First, DOB | 1, 3 | |

-continued

| Fields | Records | Set size exceeds m |
|---|---|---|
| First, DOB | 4, 5 | |
| First, Phone | 1, 3, 4 | |
| First, Zip | 1, 3, 4, 5 | X |

The First, Zip blocking set is likewise dropped because it exceeds m and no field follows Zip (Note that if the "Min fields for Oversized Blocking" were set to 2, we would process this blocking set using the methodology described in "Oversized Blocking Sets" below. However, in the preferred implementation, we would not set this parameter as low as 2). Therefore, these blocking sets are produced:

| Fields | Records |
|---|---|
| First | 2, 8 |
| Last | 1, 4, 5 |
| Last | 2, 8 |
| DOB | 1, 3 |
| DOB | 4, 5 |
| Phone | 1, 3, 4 |
| Phone | 2, 6, 8 |
| First, Last | 1, 4, 5 |
| First, DOB | 1, 3 |
| First, DOB | 4, 5 |
| First, Phone | 1, 3, 4 |

Table 5. All Blocking Sets Produced

Note that, as shown in Table 5, we do not store the field values (i.e. "John", "Sally") or even the hash-values for the fields along with the blocking sets. We only store the information shown: the fields and the record id's.

When subsets are removed (Process 73 of FIG. 4) these blocking sets remain:

TABLE 6

| Blocking sets with Subsets Removed |
|---|
| Records |
| 1, 4, 5 |
| 1, 3, 4 |
| 2, 6, 8 |

Example Create Blocking Sets

Here we give a more detailed discussion of the Create Blocking Sets phase (Process 71, for which we have detailed overview in FIGS. 5 and 6).

Data structures used to create these sets of similar records, or blocking sets, include:
  1. A list of the blocking fields
  2. Two sets of blocking sets. (Note that, more precisely, these are 'bags' of blocking sets, since they may contain duplicate elements, that is, duplicate blocking sets. But we will continue to use the term sets, since 'bag' is employed so rarely)
     a. An output set of blocking sets, which contains blocking sets with m or fewer elements
     b. An oversized set of blocking sets, which contains blocking sets with more than m elements A blocking set is represented by a list of the blocking fields used to create it, and an array of integers indicating the ID's of records in the set. A set of blocking sets is represented by an array of blocking sets.

The Algorithm
  Input:
    The record-id/hash-id (RIHI) structure. This is an in-memory structure listing all the hash-id's for each of the values for each record. There is a separate RIHI for each blocking field. An illustration of an RIHI for first name was given in Table 4.
    The list of blocking fields
  Algorithm:
    1) Initialize the output and oversized sets from the inverted indexes:
      a) Invert the RIHI for each column, recording all record id's for each hash-id.
    The example in Table 4 would become:

TABLE 7

| Inverted RIHI Table | |
|---|---|
| Hash ID | Record-ID |
| 1,969,735,650 | 1, 3, 4, 5 |
| 2,314,539 | 2, 8 |
| 74,665 | 6 |
| 79,649,227 | 7 | b) Process 90 triages the Hash ID's based on the count
      i) count=1: no records match; discard the HashID
      ii) 1<count≦m: a blocking set of the right size has been found; insert it in output set
      iii) m<count: the blocking set is too big; insert it in oversized set (File 72)

Following this step, the values in the columns RIHI which are in fewer than m records are no longer needed (because the records have already been made into a blocking set in the output set (File 12) and thus any blocking set formed which blocked on these values would be a subset of one of the blocking sets which we just added to the output set) so they are removed. Thus the RIHI structure for first name shown in Table 4 becomes as shown in Table 8.

TABLE 8

| RIHI table after purging hash id's with counts less than m | |
|---|---|
| Record Id | Hash ID |
| 1 | 1,969,735,650 |
| 3 | 1,969,735,650 |
| 4 | 1,969,735,650 |
| 5 | 1,969,735,650 |

Note that because the record ID's are no longer dense, the inverted index can be represented by a map now, instead of an array. In an exemplary non-limiting implementation, it remains an array.
  2) create a temporary set of blocking sets
  3) while (the oversized set is not empty) do
    a) for each blocking set M in the oversized set
      i) for each blocking field B whose index is greater than the largest index of the blocking fields used to create M (This implements the 'following' blocking field discussed above.)

(1) categorize the records in M into new blocking sets by their value for field B (making use of the RIHI for B (structure 76 of FIG. 6))
(2) Process 92: triage the new blocking sets based on their size
   (a) size=1: no records match; discard the blocking set
   (b) 1<size≦m: a blocking set of the right size has been found; insert it in output set
   (c) m<size: the blocking set is too big; if another blocking field can be added to the set then insert it in temporary set, otherwise discard it
   ii) end for
b) end for
c) oversized set←temporary set (Process 38)
d) empty the temporary set
4) end while An alternate implementation is to replace 3) above with a method which intersects all the oversize blocking sets rather than categorizing the blocking sets by making use of the RIHI. Note that this implementation's design shares many steps and files which are used above. The alternate implementation follows:

3) while (the oversized set is not empty and there are at least two sets in oversized set whose intersection does not equal their union) do
   a) for each blocking set M in the oversized set
   i) for each other oversized set N in the oversized set
      (1) If M is not a subset of N and N is not a subset of M
         (a) Intersect M and N
         (b) triage the new intersected blocking set based on its size
            (i) Process 34: size≦1: no records match; discard the blocking set
            (ii) Process 12: 1<size≦m: a blocking set of the right size has been found; insert it in output set (File 12)
            (iii) Process 36: m<size: the blocking set is too big; insert it in temporary set
   ii) end for
   b) end for
   c) oversized set←temporary set (Process 38)
   d) empty the temporary set Correctness An example non-limiting implementation finds the blocking sets because every possible combination of blocking fields that produces a blocking set that has more than m records is examined exactly once. And for each such blocking set, all blocking fields that could select a smaller blocking set are examined.

This example algorithm terminates because the oversized set is eventually emptied. It is emptied because eventually each blocking set either
1) has m or fewer entries and is discarded (step 3)a)i)(2)(a)) or placed in the output set (step 3)a)i)(2)(b)), or
2) cannot add any more blocking fields (i.e., has added the last blocking field) and is discarded (step 3)a)i)(2)(c)).

Other Issues

Here we address some other issues.

Example Dependant Blocking Fields

In general, if blocking field x functionally depends on blocking field y, where "functionally depends" takes its database meaning, then field x should not be added to a blocking set that contains field y because field y has already made finer categorizations than field x would. However, this analysis only holds in an unusual case: all values in the pair of fields x and y are correct, or whenever field x is null field y is also null. Since blocking processes dirty data, this condition does not hold for input data. It does, however, hold for derived fields.

Therefore, line 3)a)i) above should be changed to say:
"for each blocking field B whose index is greater than the largest index of the blocking fields used to create M and such that B is not derived from any of the blocking fields used to create M"

Example Stacked Data

If a field may contain multiple values, then we say that the data in the field is stacked. Suppose field b of table t is stacked. We define our blocking semantics on stacked data as follows: records r and s in table t might match if some value for field b in r matches some value for field b in s. To handle stacked data we change the 'build inverted index' step which produces the structure shown in Table 7 to include every value in a field and change line 3)a)i)(1) in the algorithm above to say
"categorize the records in M into new blocking sets by their values for field B"

where the plural 'values' refers to all of the stacked values.

Example Misfielded Data

Often the blocking administrator would like blocking to match on data that have been placed in the wrong field. This misplaced data is called misfielded data. For example, consider the data in Table 9. In it, record 5 has misfielded the value for Last in Middle, and record 8 has misfielded the value for Last in First and misfielded the value for First in Last. Record 8 illustrates a special case of misfielded data in which the fields are swapped.

TABLE 9

Misfielded and Swapped Data

| ID | First | Middle | Last | Phone |
|---|---|---|---|---|
| 1 | Arthur | | Goldberg | 212 685-2961 |
| 2 | John | | Miller | 646.526.5000 |
| 3 | Arthur | | Goldberg | 212 685-2691 |
| 4 | Arthur | | Goldberg | 212 685-2691 |
| 5 | Arthur | Goldberg | | |
| 6 | Jon | | Muller | 646 526-5000 |
| 7 | Sally | | Strothers | |
| 8 | Miller | | John | 646 526-5000 |

Consider data which belongs in field1 but has been misfielded in field2. To compensate for this error, blocking compares values in field1 with values in field2. This can be implemented by moving the values of field2 'back' into field1 and matching on field1 so that blocking on field1 will find matches between values from field1 and field2. We simplify the implementation by storing the moved values as stacked data in field1. Of course, the data can only be moved if the two fields store comparable types. Combining fields may yield false matches, such as between people with the first name Spencer and people with the last name Spencer, but we anticipate that such false positives would be relatively small, and, in any event, the burden is on the SSMA to remove false matches.

Continuing the example in Table 9, suppose blocking is configured to look for First field values misfielded in the Last field and Last field values misfielded in the Middle column. Then Table 10 shows the Last and Middle values moved into the First values as stacked data. Now blocking on First will find that record 5 still matches records 1, 3 and 4, and that record 8 still matches record 2.

TABLE 10

Moving Values into Stacked Fields
Finds Misfielded and Swapped Data

| ID | First | Middle | Last | Phone |
|---|---|---|---|---|
| 1 | Arthur, Goldberg | | | 212 685-2961 |
| 2 | John, Miller | | | 646.526.5000 |
| 3 | Arthur, Goldberg | | | 212 685-2691 |
| 4 | Arthur, Goldberg | | | 212 685-2691 |
| 5 | Goldberg, Arthur | | | |
| 6 | Jon, Muller | | | 646 526-5000 |
| 7 | Sally, Strothers | | | |
| 8 | Miller, John | | | 646 526-5000 |

Example Processing for Some Deduplicated Data

As indicated in Table 1, some of the data that blocking processes may be already deduplicated. If a data source has already been deduplicated, then in the exemplary illustrative non-limiting implementation we discard a blocking set that contains only records from that data source. In particular, we change 1)b) to say "For each hash ID whose associated record-ID list includes at least one record from an un-deduplicated data source, Process 90 triages the Hash ID's based on the count". Likewise, we change 3)a)i)(2) to read "For each blocking set whose associated record-ID list includes at least one record from an un-deduplicated data source, process 92 triages the new blocking sets based on their size."

If we were matching two already deduplicated data sources, then we would substitute "one record from each data source" for the phrase "one record from an un-deduplicated data source" above.

Example Subset Elimination

As we see in the above section entitled "Create Sets of Similar Records Examples", our blocking algorithm can produce redundant blocking sets, in the sense that one blocking set may be a subset of another. A subset is redundant because all pairs within the subset will be processed by the SSMA when its superset is processed. Thus, we would like to remove subsets. Precisely, given a set of sets, we would like to remove any set that is a subset of another set. Note that we are using "subset" in its mathematical sense here, where if we say that A is a subset of B, we mean A is included in B, not necessarily that A is a proper subset of B.

This algorithm is useful for batch automated blocking and record matching, but also solves an abstract problem which has wide applicability. For instance, this algorithm could also be used for removing redundant constraints from automatically generated truth tables used in propositional logic, in computer vision, for helping to build an incremental compiler, or in other fields where one is working with large datasets.

Note that an alternate approach to the problem is given in Paul Pritchard, "On Computing the Subset Graph of a Collection of Sets", Journal of Algorithms, vol. 33, 187-203 (1999), incorporated by reference herein, where he refers to the problem as that of finding the "maximal" set of a collection of sets. In an alternate implementation, one could use Pritchard's algorithm.

Example Subset Elimination: Data Representation

Let X represent a set of sets, and A represent a set in X. Without loss of generality, we assume that each element in A is an integer. Naturally, the integer may be stored in a representation that is large enough to represent all distinct elements. The current implementation represents the integer as a Java long, which is 8 bytes, which can represent over $10^{19}$ distinct elements.

Example Subset Elimination: Algorithm

A brute force approach to eliminating subsets considers each set A in X, and checks whether each other set in X is a subset of A. (Alternatively and equivalently, the approach could check whether each other set in X is a superset of A.) One can straightforwardly check whether B is a subset of A by storing each element of A in a hash and checking whether every element in B is in A. If any element in B is not in A, this approach returns 'no'. Otherwise, if all elements in B are in A, this approach returns 'yes'.

Letting n denote |X| and m indicate the size of the biggest set in X, the brute force approach above runs in $O(n^2m)$. The approach's average complexity is n(n−1)(average number of hash lookups needed to determine whether a set is a subset of another)/2.

Recognizing the following properties helps design an algorithm that usually runs faster:

Set B can be a subset of set A only if |B|<|A|.

Another way to check whether B is a subset of A sorts both A and B, and then scans them from smallest to largest, checking whether each element in B is in A:

```
/*
return true if B is a subset of A; assumes that both A and B are sorted in
increasing order, and are formally sets, i.e., have no duplicates.
*/
boolean isSubset( int[ ] A, int[ ] B)
{
    if( A.length( ) < B.length( ) ) return false;
    int indexA, indexB = 0;
    while( true )
    {
        if( A.length( ) == indexA )
        {
            // scanned to the end of A without matching all of B
            return false;
        }
        if( A[indexA] > B[indexB] )
        {
            // the value in B is not in A
            return false;
        }
        if( A[indexA] == B[indexB] )
        {
            indexA++; indexB++;
            if( B.length( ) == indexB )
            {
                // matched all of B
                return true;
            }
            continue;
        } else
        {
            // skip the value in A that is too small
            indexA++;
        }
    }
}
```

Third, one can simultaneously check whether B is a subset of 2 sets $A_1$ and $A_2$ by walking a tree which stores $A_1$ and $A_2$. Suppose $A_1$ and $A_2$ are stored in a tree which represents each set by a path from the root to a leaf. Such a tree is called a suffix tree. For example, if $A_1=\{2, 5\}$, $A_2=\{2, 4, 8\}$, and $A_3=\{2, 4, 6, 10\}$ then they can all be represented by the tree which can be written as [2[4 [6[10], 8], 5]] or illustrated graphically as shown in FIG. 8. One can check whether B is a subset of any set in the tree ($A_1$, $A_2$, or $A_3$) by walking the tree from the root. Below, we generalize this observation to a tree that contains many sets.

This example algorithm also has the advantage that it organizes the blocking sets into blocking trees. Organizing the data into blocking trees allows the chunking step (Process 75) to pack the data into fewer chunks and it also makes the chunk processing step (Process 77) more efficient because we can avoid doing some redundant comparison of record pairs.

We can combine these properties in the following example algorithm, called SubsetElimination, which stores sets in a suffix tree S. In particular, there is a one-to-one correspondence between sets stored in S and paths in S from the root to a leaf. That is, each set stored in S is represented by a path from the root to a leaf, where each node on the path is labeled by the value of an element in the set, and labels increase on the path. (Equivalently, the labels could decrease on all such paths.) This is a generalization of the example above.

The input is X, a set of sets.
1) Arrange the sets in X in non-increasing size
2) Create an empty suffix tree S
3) Create an empty set Y
4) For each set A in X, in non-increasing size
   a) Sort the elements of A in increasing order (or, equivalently, decreasing order)
   b) Determine whether A is a subset of another set in the suffix tree:
      isSubset=searchSuffixTree(S, A)
   c) if(not(isSubset)) then call insertIntoSuffixTree(S, A)
The output is S, which now contains all the sets in X that were not a subset of another set in X.

The function searchSuffixTree(S,A) determines whether A is a subset of any set in S. It works by advancing through the increasing (or, equivalently, decreasing) elements in A and comparing them with the elements on paths in S from the root to leaves. Note that if multiple sets in S share the same elements below a certain value, then A will only be compared once against the shared elements.

This function begins by considering the first element in A and the root of the tree.

```
/**
return true if A is a subset of any set in the suffix tree S; otherwise return
false
**/
boolean searchSuffixTree( S, A )
{
    // (Assume that A is an array indexed from 1 to A.length( ).)
    return recursiveSearchSuffixTree( S.getRoot( ), 1 );
}
/**
return true if A[ i, A.length( ) ] is a subset of any set in the subtree of the
suffix tree S rooted at node n; otherwise return false
**/
boolean recursiveSearchSuffixTree( node n, index i )
{
    if( i == A.length( ) )
    {
        if( n has a child whose value is A[i] )
        {
            return true;
        }
        return false;
    }
    if( i < A.length( ) )
```

```
{
    if( n has a child C whose value is A[i] )
    {
        result = recursiveSearchSuffixTree( C, i+1 )
    }
    if( result )
    {
        return true;
    }
    let L be the children of n whose values are smaller than A[i]
    for each l in L
    {
        result = recursiveSearchSuffixTree( l, i+1 )
        if( result )
        {
            return true;
        }
    }
    return false;
    }
}
```

If A was sorted in decreasing order as in an alternative implementation, then the word smaller in the pseudocode above would need to be changed to larger.

Example Subset Elimination Proceeding from Small to Large Cardinality

The exemplary non-limiting implementation, uses an alternative approach in which we remove subsets by checking for supersets and process the sets in order of cardinality from smallest to largest rather than from largest to smallest. This is preferred over the previous method, because the previous method requires us to examine all children of a node. This method allows us to check only those specific children of the given node which are contained in the set with which we are searching the tree. Although there are theoretical scenarios in which proceeding from large to small cardinality would be preferable, we have experimentally found this implementation to be superior.

We need to sort the sets from the smallest to the largest by size and each set is sorted in ascending order.

As an example, let's suppose that we are processing these sets:

$\{2, 5\}$ $\{2, 4, 8\}$ $\{2, 4, 6, 10\}$

A diagram of the tree created by the first three sets is listed in FIG. 8.

Now let's suppose we add a fourth set:

$\{1, 2, 4, 5, 8\}$

When we process this set, we look to see if there are subsets of the fourth set already on the tree, and if so, we remove them before adding it to the tree. A diagram of the tree after processing the fourth set is listed in FIG. 8A.

Pseudo code for this example implementation of the algorithm is given below. This implementation is further illustrated in FIG. 10.

```
/**
This builds a suffix tree from the set of arrays.
**/
void buildTree ( )
{
```

-continued

```
S = new empty suffix tree
While (more arrays) {
    A = next array in the set    // Process 404
    checkForSubsets (S, A, 0)
    addToTree (S, A)
}
}
/**
Process 406
This goes through the suffix tree S and removes all subsets of array A.
N is the current node in the suffix tree.
i is the current index of the array. i goes from 0 to one less than the size
of A.
**/
void checkForSubsets ( S, N, A, i )
{
    for (j = i to one less than the size of A)
    {
        C = N.findChild (A[i])
        if (C is not null)
        {
            if (C has no children)
            {
                //this leaf is a subset of A so remove it
                RemoveNode (C)
            } else {
                checkForSubsets (S, C, A, i+1)
            }
        }
    } //end for
}
/**
Process 408:   This method adds the array A to the suffix tree S.
**/
void   addToTree ( S, A )
{
    cur = get root node of S
    for (i = 0 to A.size − 1)
    {
        Child = cur.findChild (A[i])
        if (child == null)
        {
            child = cur.addChild (A[i])
        }
        cur = child
    }
}
```

Note that the findChild method of a Suffix Tree node is a fast operation, because the children of a node are stored in hash.

Example Subset Elimination: Low Memory Considerations

The above algorithm works well, but it assumes that memory is large enough to hold a suffix tree that stores all the blocking sets. In practice, however, the suffix tree may not fit into memory. Except for pathological cases in which, for instance, a single set is so large that we cannot fit all of its elements in memory (which could not occur in the application to the Batch Automated Blocking Algorithm because sets are limited to contain no more than m elements), one example implementation eliminates all subsets even when the suffix tree does not fit into memory.

In further detail, the exemplary illustrative non-limiting implementation of Process 73 proceeds as illustrated in FIG. 10. We start (Process 400) by setting an iterator variable i to 1. Then Process 401 establishes a lower bound (LB) and an upper bound (UB) on the cardinality of the sets we will process next. The key parameter used to compute the upper and lower bound is "k" (see Table 2), which in the example implementation is typically set to 5. UB and LB decrease by k with every iteration of the algorithm. Process 402 checks whether UB≦1. When it is, we exit.

Next, Process 404 reads those blocks (or sets) with cardinality between LB and UB in ascending order, passing each block to Process 406. Process 406 removes sets in the Suffix Tree that are subsets of the current block using the algorithm given in the pseudo-code procedure "checkForSubsets" above. Process 408 then adds the current block to the Suffix Tree using the method shown above in the procedure "addToTree".

If the memory is not full (Process 410) and we are not done with processing those blocks whose cardinality lies between LB and UB (Process 416), we go back to Process 404 and get the next block. On the other hand, if the memory is full, we write out the suffix tree to a temporary block file (Process 412 writes File 453), free the memory from the current Suffix Tree (Process 414) and continue processing (Process 404). When we have completed processing the sets with cardinality between LB and UB, we proceed to Process 418, where we compare the current in-memory suffix tree to the File of Bigger Blocks (File 452), eliminating from the Suffix Tree, those blocks in the Suffix Tree which are subsets of blocks in the File of Bigger Blocks. At the completion of Process 418, we know that the Suffix Tree contains no subsets of any other set found in File 12, so Process 420 write the Suffix Tree to the File of Bigger Blocks and to the output Trees File (File 14).

Next, in Process 422 we ask whether there are any Temp Block Files (whether anything was written to File 453). If so, we build a Suffix Tree from the temp file with the largest cardinality, pass this tree to Process 418, and remove the temp file.

Finally, once we have done all of the above we have completed an iteration of the algorithm. We increment i in Process 426 and loop back to Block 401.

Example Chunking

In general, it can be assumed that all of the records being matched will not fit inside the RAM of a single machine. Hence a purpose of the exemplary illustrative chunking step is to partition the set of blocking trees into "chunks" of blocking trees, each of which is small enough to fit into the memory of a single machine. A configuration parameter specifies the maximum number of records in a chunk. Secondarily, we also assemble all the record data into a separate set of files for each chunk so that the files can optionally be dispatched to different machines for parallel processing and so that no random access is required to retrieve the data for each chunk.

FIG. 7 shows an example illustrative non-limiting more detailed implementation of the "create chunks" process (block 75) shown in FIG. 4. In the FIG. 7 example shown, the blocking tree file is used by the partition chunks process (block 61) to provide a plurality (any number) of chunk ID files 63(1) . . . 63(n) and corresponding chunk blocking tree files 16(1) . . . 16(n). These various chunk ID files and chunk blocking tree files 63, 16 are used by process 75 to create a chunk data file based on the master data source 104 and staging data source 102. The resulting chunk staging data files and chunk master data files 18(1) . . . 18(n) are then processed independently in the exemplary illustrative non-limiting implementation using SSMA processes 77(1) . . . 77(n) to provide a series of matches identified by SSMA (file 20).

In an example implementation, each chunk is represented by three distinct files:
  Chunk Blocking Tree File (File 16). A file listing the blocking trees being processed with the chunk, one row per blocking tree.
  Chunk Staging Data File (File 18). A file containing the data for the records being processed in the chunk which come from the staging data source.

Chunk Master Data File (File 18). A file containing the data for the records being processed in the chunk which come from the master source. Note that in an alternate implementation, one could combine the master and staging data sources into one file.

These three files contain all the information necessary for the chunk to be processed by the SSMA.

A two phase process creates the chunks:
1) Scan the blocking trees and load each chunk with a list of record ID's. Chunks are made until all the blocking trees have been added to a chunk.
2) Populate the chunks with data.

Partition Blocking Trees into Chunks

This phase loads the chunks with a list of record ID's. For example, consider the blocking sets in Table 6. Suppose that Process 73 placed each of these blocking sets in a separate blocking tree. If the maximum chunk size is 4 records, then all the blocking trees would fit in 2 chunks, like this

TABLE 11

Optimal chunking with maximum chunk size of 4

| Chunk | Blocking tree(s) | Record ID's | Number of records |
|---|---|---|---|
| 1 | {{1, 4, 5}, {1, 3, 4}} | 1, 4, 5, 3 | 4 |
| 2 | {{2, 6, 8}} | 2, 6, 8 | 3 |

In this case the total number of records in all chunks is 7.

However, if the maximum chunk size (MCS) is only 3 records, then we would require 3 chunks, as shown in Table 12, to hold all the blocking trees.

TABLE 12

Optimal chunking if maximum chunk size is 3

| Chunk | Blocking tree(s) | Record ID's | Number of records |
|---|---|---|---|
| 1 | {{1, 4, 5}} | 1, 4, 5 | 3 |
| 2 | {{1, 3, 4}} | 1, 3, 4 | 3 |
| 3 | {{2, 6, 8}} | 2, 6, 8 | 3 |

The total number of records increases to 9 in this case because records 1 and 4 may each be copied into 2 chunks. With an MCS of 3, this is the optimal allocation of blocking sets into chunks. However, if the MCS were 4, then this would be suboptimal and the chunking shown in Table 11 would perhaps be preferable.

There are many possible approaches to this chunk partitioning phase. In one example implementation, one can use one of a variety of graph algorithm approaches to attempt to find an optimal chunk partitioning. This is achieved by first representing every record id as a point on a graph and then drawing an edge between two points if the corresponding record ID's both belong to the same blocking set. We then search for ways to divide the graph into multiple partially overlapping subgraphs such that no subgraph contains more than MCS vertices, all edges are contained within at least one subgraph, and the sum of the number of vertices in each subgraph is at a minimum.

This graph implementation can be trivially accomplished if the graph can be divided into connected components (using depth first search (Cormen, Leiserson, et. al. 2001)), none of which has a size greater than MCS. This yields an optimal chunking, but one cannot expect this property to hold with real-world data sources. Similarly, one can divide the graph into bi-connected (Cormen, Leiserson, et. al. 2001) or tri-connected components (Gutwenger and Mutzel, 2000), which will tend to minimize the number of edges that are crossed between chunks, but again, one cannot expect that in general a graph can be broken down into triconnected components which will contain fewer than MCS vertices.

Although we do not have a proof, we believe that the general problem of finding an optimal chunking is NP-complete. Hence we are left with heuristic methods. There are many possible heuristics. One method, for instance, would be to arbitrarily select a blocking set (note that in this approach we would decompose the blocking trees into blocking sets), which is represented as a clique on the graph (a "clique" is a subset of vertices, each pair of which is connected by an edge) (Cormen, Leiserson, et. al. 2001). We would place this blocking set in a chunk. We would next place into the chunk the clique where the ratio of the clique's vertices inside the chunk to vertices outside the chunk was the highest. We would continue in this manner, marking cliques/blocking sets as added to the chunk until the chunk was full. We would then repeat until all cliques had been removed from the graph and added to a chunk.

All of these methods share the disadvantage of requiring that one build a graph representation of the blocking sets in memory. It may not be feasible to do this when the graph is large. In an example non-limiting implementation, we do not build a graph in memory, but instead proceed as follows:

1. Read the file of blocking trees sequentially, one blocking set at a time
2. Create an empty set of integers c
3. While |c|<MCS
   a. Read in the next blocking tree b and write it out to file chunk_i
   b. For every record r in b
     i. If r is not in c, add r to c
4. end-while
5. i++
6. If there remain blocking trees in the blocking tree file, go to 2

This exemplary illustrative non-limiting chunking algorithm does not attempt to come up with an optimal chunking. However this may not be critical since if a record is in n blocks, it cannot be in more than n chunks. In general, one would expect the average size of n to be proportional to the number of blocking fields and hence to be relatively small, typically less than 10. Hence this simple approach is likely to be no worse than 10 times worse than an optimal chunking and probably much better.

We are also aided here by having organized the blocking sets into blocking trees. When subset elimination places two blocking sets in the same blocking tree, we know that they share at least one member. Since an entire tree will always be placed in the same chunk, this will increase the tendency for blocks with overlapping records to be placed in the same chunks. Note one caveat, however: The algorithm described above in the section "Subset Elimination: Low Memory Considerations" ensures that all duplicate blocks will be deleted, but two blocks which share a common prefix will end up in different trees if they fall into Example Populate the Chunks with Data This phase in the exemplary illustrative non-limiting implementation reads the data and populates chunks.

In one example implementation, the data is accessed either by scanning the data once or by accessing the data randomly, whichever is faster. We estimate the data access time as follows:

- The time to scan the data is estimated by the size of the data divided by the scan rate.
- The time to access the data randomly is estimated by the number of records in the chunks times the average random access delay. Note that some data sources may not permit random access (for instance if the data source is a flat file), therefore this option may not always be available.

The fastest access method is chosen for each data source. Note that random access will generally only dominate when the staging data source is very small relative to the master data source, so in the general case we are maintaining the property that the algorithm does not require random access to a data source.

In an alternate implementation, the data is always accessed by scanning.

First the record ID's in each chunk are sorted. If all chunks can fit in memory, they are stored there. Otherwise, the chunks are written to disk, and the start of each chunk is opened so its record ID's can be scanned in order. A sorted list called the NextRecordList identifies the next record ID needed for each chunk. (The merge phase of mergesort employs a similar list.)

Also, for each chunk, we create a staging and master chunk data file into which we will write the chunk data (note that in an alternate method, we could prefix the id's for the staging and master files with appropriate tags, such as "m:" for master and "s:" for staging to ensure that every id is unique. Then we could combine the staging and master chunk data file into a single chunk data file).

Next, each data source is read using the fastest method or is simply scanned, depending on the implementation.

If the data is scanned, then the record ID's have been formed (as described in the above section "Record ID") so they appear in increasing value in the data source (note that it may be desirable to work in this step with the original record ID's rather than with an ID which was assigned to the record by the algorithm as we will likely need the original ID when reading the record from the data sources). Whenever the next record identified in the NextRecordList is reached, the record's data is read from the data source and copied into the appropriate chunk data file(s). The NextRecordList always contains the smallest record ID needed by any of the chunks, so every record needed by a chunk is copied as the scan of the data source reads it.

If the data is read via random access, then the records indicated by the record ID's are simply read and loaded into the chunks.

This algorithm is straightforwardly implemented as two concurrent processes. The first maintains the NextRecordList. The second reads the NextRecordList, reads the data and loads records identified in the NextRecordList into the appropriate chunks data files.

Example Working with Limited Number of File Handles in Chunking

The above algorithm can break down if the process is not able to access a sufficient number of file handles. At any time, Process 75 opens the Chunk Blocking Tree files (File 65) for reading and either the Chunk Staging Data files or the Chunk Master Data files (File 18) for writing. On many systems, a process is not allowed to have more than about 1,000 file handles opened for reading or writing at once. If this were the limit, then Process 75 would run out of file handles if it needed to write out more than about 500 chunks.

We solve this problem by proceeding in multiple passes. Given an input max_chunk_files giving the maximum number of chunks the system is allowed to write out at one time (see Table 2), we simply open chunk files 1 . . . max_chunk_files for writing on the first pass. When writing out chunks on the first pass, we proceed as described in the above section "Populate the Chunks with Data" except that we only process chunks 1 . . . max_chunk_files. On subsequent passes, we simply process chunks max_chunk_files+1 . . . (2max_chunk_files), (2max_chunk_files)+1 . . . (3max_chunk_files), etc, reading the database sequentially once on every pass.

Tables Other than the Base Table

Frequently the data are stored in multiple database tables, as was illustrated in FIG. 2. Although the algorithm described above in the section entitled "Populate the Chunks with Data" can operate while scanning the base table once, it would need to randomly access other tables. This section presents an alternate implementation that can avoid any table scans.

Think of the tables in which the data are stored as a tree rooted at the base table. Each edge between a parent and a child may be represented by a foreign key in the database. To load the chunks while scanning tables, we walk down the tree from parent to child. When scanning a parent we prepare to scan the child by writing out the ID's that we will need in the child table to a buffer. Hence we will replace the record ID's in each blocking set with appropriate ID's from the child table.

There are only two possible cases that determine what we need to write to the buffer:
- the foreign key points from the parent to the child
- the foreign key points from the child to the parent.

This table indicates how the cases are handled:

TABLE 13

| Direction in which the foreign key points | What gets buffered when scanning the parent table | How a record from the child is selected when the child table is scanned |
| --- | --- | --- |
| parent to child | The foreign keys for records that that are being loaded | The record's primary key is looked up in the buffer (which is a hash); if the key is found, then the record is written to the relevant chunk |
| child to parent | The primary keys for records that that are being loaded | The record's foreign key is looked up in the buffer (which is a hash); if the key is found, then the record is written to the relevant chunk |

The above implementation assumes that the buffer, which lists all the chunks to which each child key belongs, can be stored in memory as a hash. In an alternate implementation, the record ID's for the child tables for each chunk could be sorted and then the processing of the child tables could proceed in a manner analogous to that described in the section entitled "Populate the Chunks with Data".

The techniques described in this section for processing child tables so as to avoid random access can be similarly applied when loading the RIHI tables.

Example Oversized Blocking Sets

An 'oversized blocking set' is a blocking set which has more than the maximum acceptable number of record ID's (typically denoted by m) which all match on a minimum number of columns, a configuration parameter of the algorithm.

Example Oversized Blocking Sets: the Challenge

The "Create Sets of Similar Records" step discards oversized blocks in step 3)a)i)(2)(c). Unfortunately, this strategy could discard too many potential matches. For instance, we've worked with a database that contained 2000 identical copies of a given record. Without oversized block processing, this blocking set would be discarded and those records would not be identified as duplicates, resulting in a huge amount of inaccuracy for the algorithm.

Example Oversized Blocking Sets: the First Step

First, we discard all oversized blocks selected on an insufficient number of columns. As noted above, the minimum number of columns is a configuration parameter. We also discard oversized blocking sets which are too large, as specified by the "Max Oversized" parameter described in Table 2.

Example Oversized Blocking Sets: the Core Records Approach

This approach avoids the $O(n^2)$ cost of matching each pair of records in an oversized block that contains n records. We employ a heuristic that selects a subset of the $O(n^2)$ pairs in the block for matching. A core set of c records is chosen and the following pairs of records are matched by the SSMA (while being careful to avoid multiply matching a given pair):

For each record r in the core set, all pairs formed between r and every other record in the oversized blocking set For each record not in the core set, all pairs formed between the record and a small constant number of other, randomly selected records not in the core This is linear in n, since it costs $O(c^2+cn)$.

Example Process Chunks and Find Matching Pairs

This section describes in more detail how an exemplary illustrative non-limiting implementation of the algorithm processes chunks using the Second Stage Matching Algorithm (SSMA). This is the last stage of processing and is shown as Process 77 in the drawings.

In one example implementation, chunks are passed to the SSMA. Each chunk—which includes the elements shown in Files 16 and 18 (the list of blocking sets in the chunk, and the staging and master chunk data file)—is small enough to fit into memory. Each chunk is processed separately. If multiple machines are available, multiple chunks may be processed simultaneously on separate machines. If a single machine has multiple processors, the preferred implementation is to subdivide Files 16 into multiple subchunks, each of which is assigned to a processor as it becomes available. In this way all the processors on the machine can be looking at a single in-memory data structure while each working on a different blocking tree.

We now describe example steps taken to process a chunk.

1) Load the staging and master chunk data files into memory

2) Process each blocking set in the chunk blocking set file
a) For a given blocking set
i) For each pair of records in the blocking set, retrieve each record's data from memory and use the SSMA to determine whether the pair of records matches.
ii) If the SSMA determines that the pair of records matches or is a likely match, then output the RecordIDs of the two records and an indication of the likelihood that they match.

Various final outputs are possible. In a first example implementation, the output is a list of record pairs annotated with an indication of whether the records match or not, possibly including the SSMA's degree of certainty in its decision. Each record is identified by its RecordID.

In the final step, the output of all chunk processing is merged into a single output. After this step, in the example implementation, Process 79 of FIG. 4 removes any duplicate matching record pairs from the merged output. In the example implementation, this is done by first finding duplicate record pairs using an in-memory hash structure, where Process 79 limits the hash structure to holding no more than max_pairs (see Table 2) of record pairs. Once Process 79 has filled up the in-memory structure with max_pairs of pairs, it writes out the pairs in sorted order to a file. Process 79 proceeds like this, writing out every internally deduplicated set of match pairs to a different file until it has processed all of File 20. Process 79 then merges the resulting files together to create a file of deduplicated matches (File 22).

In a second example implementation, all records which the SSMA computes as matching are output as an equivalence class. An equivalence class is essentially the same as a blocking set except that all records within the equivalence class have been determined to be matches by the SSMA whereas in a blocking set they are only potential matches. In this implementation, we represent each equivalence class as the list of record id's which compose the equivalence class (in a similar manner to the representation of blocking sets). One way of accomplishing this implementation is to read in the final output described above in implementation 1, represent the records as a graph (with edges between those records which the SSMA determined to be a match) and then compute all equivalence classes using depth first search.

Example Non-Limiting Applications

The example illustrative non-limiting algorithms described herein can be used to tackle a broad variety of data quality and other issues including for example:

Individual matching. Determine whether two records refer to the same individual.

Householding. Identify all the people belonging to the same household.

Business matching. Determine whether two records refer to the same organization.

Supply Chain matching. Match products across multiple catalogs.

Financial securities matching. Determine whether two records refer to the same financial security.

News or text matching. Match news articles or other text-based records as the same document State-wide Student Identification System. Match K-12 students across a state as they move from district to district.

A database seeking to track everyone in the vicinity of a particular event (e.g., the World Trade Center on Sep. 11, 2001) for epidemiological studies on health issues such as lung cancer, depression, etc.

A system to provide real-time matching of a nationwide database of millions of healthcare professionals A children's immunization database. This is a particularly challenging problem, particularly in a large city such as New York City, because children often receive their first vaccination (for Hepatitis B) the day they are born, at which point they often have not been given a first name; children's names change frequently due to nicknaming, Americanization, a mother marrying and changing her name along with the child's, or any one of a number of reasons; and the diversity and unfamiliarity of a multi-ethnic population may lead to an increased number of spelling errors.

Many other applications.

For example in one particular context relating to insurance, it may be possible to use the exemplary illustrative non-limiting implementation to deduplicate a database of 10's of millions of insurance policies to link automotive policies, homeowners policies, life insurance policies, etc. It addition, it may be possible to link the records of current policy holders with those of sales prospects. This process would need to be highly accurate so as to get the maximal possible linkage, but on the other hand would need to work relatively quickly: taking well less than a week and preferably less than two days. The process would also need to be easy to install and easily modifiable to accommodate, for instance, the addition of a new field to the database schema. Typical fields available for matching in such an illustrative implementation would include name, address, birthday, make of car, etc. Finally, a requirement might be that the process should be able to operate across a range of hardware platforms, including mainframe, Windows, and Unix. In such a context, an exemplary combination of this technology with the Automated Database Blocking and Record Matching technology and using Maximum Entropy Modeling (described in U.S. Pat. No. 6,523, 019), as the Second Stage Matching Algorithm (SSMA) could provide a system which was very fast, very flexible to changing client needs, and very accurate.

Note that the algorithm achieves both high speed and high accuracy by dynamically building blocking sets depending on the frequency of the values on a given record. For instance, we can expect that a record for a person with a first name of "Asa" and a last name of "Segur" will be placed in a blocking set with all other individuals names either "Asa" or "Segur" since in a typical U.S. database, both are rare names. On the other hand, for an individual with a more common name such as "James Smith", we would expect that "James" and "Smith" will generate "oversized blocking sets" which will need to be trimmed with the addition of additional fields in Process 71, thus resulting in, perhaps, a blocking set full of individuals whose name is "first name=James" AND "last name=Smith". Consequently, our matching criteria at this initial blocking stage for Asa Segur is relatively liberal, which allows for a greater robustness in the face of an error on either one of these rare names, while for James Smith, we avoid slowing down the algorithm by not forcing a comparison among everybody who has either of those very common names. This satisfied our dual exemplary non-limiting goals of high speed and high accuracy.

FIG. 11 shows an example non-limiting application providing blocking and matching for detecting probable matches and/or eliminating redundancies in one or more name/address databases.

While the technology herein has been described in connection with exemplary illustrative non-limiting embodiments, the invention is not to be limited by the disclosure. For example, while the exemplary illustrative non-limiting implementations have been described in connection with particular database and/or record structures, computation algorithms, processing sequences, processing constraints, applications, contexts and other details, other alternatives are possible and contemplated. The invention is intended to be defined by the claims and to cover all corresponding and equivalent arrangements whether or not specifically disclosed herein.

We claim:

1. A method of identifying duplicate records in a database comprised of a plurality of records arranged in rows and columns, the method comprising:
assigning a unique identifier to all records in the database that do not already have a unique identifier;
creating a blocking subset of between 1 and all of the columns in the database;
creating a set (S) of subsets (s), the subsets (s) consisting of the unique identifiers of records (r) from the database wherein the number of subsets (s) is less than or equal to a heuristic value wherein the heuristic value is a positive integer, m; and each record (r) in subset (s) has the same value in at least one of the columns in the blocking subset, the creating a set (S) of subsets (s) step constructs set (S) by first constructing a set (T) which may contain both sets with more than m members and sets with fewer than m members,
for every subset (s) in set (S), applying a pair-wise matching algorithm to compare every record (r) in the subset (s) to one another; and
outputting the unique identifiers of record matches identified by the pair-wise matching algorithm.

2. The method of claim 1 further comprising removing any subset (s) which is a subset of another subset (s).

3. The method of claim 1 wherein the applying a pair-wise matching algorithm step further comprises omitting comparisons of records (r) which were already compared in other subsets (s).

4. The method of claim 1 wherein the outputting step further comprises omitting duplicate matches.

5. A method of identifying duplicate records between a first database and a second database, each database comprised of a plurality of records arranged in rows and columns comprising:
assigning a unique identifier to all records in the first database and second database that do not already have a unique identifier;
creating a blocking subset of between 1 and all of the columns in the second database;
mapping corresponding columns in the first database onto the blocking subset;
creating a set (S) of subsets (s), the subsets (s) consisting of the unique identifiers of records (r) from the first database and/or second database wherein the number of subsets (s) is less than or equal to a heuristic value wherein the heuristic value is a positive integer, m; and each record (r) in subset (s) has the same value in at least one of the columns in the blocking subset, the creating a set (S) of subsets (s) step constructs set (S) by first constructing a set (T) which may contain both sets with more than m members and sets with fewer than m members;
for every subset (s) in set (S), applying a pair-wise matching algorithm to compare every record (r) in the subset (s) to one another, optionally omitting comparisons of records (r) which were already compared in other subsets (s); and
outputting the unique identifiers of record matches identified by the pair-wise matching algorithm, optionally omitting duplicate matches.

6. The method of claim 5 where the second database is presumed to be free of duplicate records.

7. The method of claim 6 where every subset (s) is required to contain at least one unique identifier from the first database.

8. The method of claim 5 further comprising removing any subset (s) which is a subset of another subset (s).

9. The method of claim 5 wherein the applying a pair-wise matching algorithm step further comprises omitting comparisons of records (r) which were already compared in other subsets (s).

10. The method of claim 5 wherein the outputting step further comprises omitting duplicate matches.

11. A method of processing a bag of sets (Q) that produces a set of sets (R) comprising:

constructing a tree data structure, which has a one-to-one correspondence between the nodes on every path between the root of the tree data structure and a leaf of the tree data structure and the elements of a set in (R); and if two distinct sets t and u, both in (R), contain identical prefixes, then one path in the tree data structure, starting at the root of the tree data structure, maps to the prefix, wherein elements of a set of sets (V) in (Q) are represented by totally ordered values, where identical elements are represented by identical values, and distinct elements are represented by distinct values; and further wherein for every unique set (s) in (Q), if (Q) does not contain a superset of (s), then (R) contains (s), and, if (Q) does contain a superset of (s) then R does not contain (s), if (s) s is a superset of a set of sets (U) in the tree data structure, removing sets (U) from the tree data structure; and adding (s) s to the tree data structure.

12. The method of claim 11 in which the construction of (R) comprises adding sets to the tree data structure in non-increasing order of the size of the sets.

13. The method of claim 12 in which adding a set (s) to the tree data structure comprises adding (s) to the tree data structure if (s) is not a subset of some set in the tree data structure.

14. The method of claim 11 in which the construction of (R) comprises adding sets to the tree data structure in non-decreasing order of the size of the sets.

15. The method of claim 11 in which the elements of each set (V) in (Q) are sorted in increasing order.

16. The method of claim 11 in which the elements of each set (V) in (Q) are sorted in decreasing order.

* * * * *